United States Patent
Arisawa et al.

(10) Patent No.: US 9,647,604 B2
(45) Date of Patent: May 9, 2017

(54) POWER CONVERSION DEVICE, MOTOR DRIVE DEVICE INCLUDING POWER CONVERSION DEVICE, AIR BLOWER AND COMPRESSOR INCLUDING MOTOR DRIVE DEVICE, AND AIR CONDITIONER, REFRIGERATOR, AND FREEZER INCLUDING AIR BLOWER AND COMPRESSOR

(71) Applicant: Mitsubishi Electric Corporation, Tokyo (JP)

(72) Inventors: Koichi Arisawa, Tokyo (JP); Keisuke Uemura, Tokyo (JP); Takuya Shimomugi, Tokyo (JP); Yosuke Shinomoto, Tokyo (JP); Shigeo Umehara, Tokyo (JP); Shinichiro Ura, Tokyo (JP); Makoto Tanikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 14/781,064

(22) PCT Filed: Apr. 8, 2013

(86) PCT No.: PCT/JP2013/060619
§ 371 (c)(1),
(2) Date: Sep. 29, 2015

(87) PCT Pub. No.: WO2014/167625
PCT Pub. Date: Oct. 16, 2014

(65) Prior Publication Data
US 2016/0049896 A1    Feb. 18, 2016

(51) Int. Cl.
*H02P 7/14*      (2006.01)
*H02P 29/024*    (2016.01)
(Continued)

(52) U.S. Cl.
CPC ............ *H02P 29/027* (2013.01); *F04D 25/06* (2013.01); *F04D 25/08* (2013.01); *F25B 31/02* (2013.01);
(Continued)

(58) Field of Classification Search
CPC .......... H02P 29/07; H02P 27/06; F04D 25/06; F04D 25/08; H02H 7/10; H02H 3/08;
(Continued)

(56) References Cited

U.S. PATENT DOCUMENTS 3,912,980 A * 10/1975 Crump .................. B23K 9/073
                                                219/130.33
5,123,746 A *  6/1992 Okado ................ H02M 7/5387
                                                363/37
(Continued)

FOREIGN PATENT DOCUMENTS

JP    H02-017868 A    1/1990
JP    H05-207766 A    8/1993
(Continued)

OTHER PUBLICATIONS

International Search Report of the International Searching Authority mailed Jul. 2, 2013 for the corresponding international application No. PCT/JP2013/060619 (and English translation).

*Primary Examiner* — Rita Leykin
(74) *Attorney, Agent, or Firm* — Posz Law Group, PLC

(57) ABSTRACT

The power conversion device includes a power-supply shunt resistance provided between an inverter and the negative-voltage side of a DC power supply, respective-phase lower-arm shunt resistances provided between the power-supply shunt resistance and respective-phase lower-arm switching elements, a first overcurrent detection unit performing overcurrent detection on a current that flows through the power-supply shunt resistance on the basis of a power-supply (Continued)

shunt-resistance voltage, and a second overcurrent detection unit performing overcurrent detection on each current that flows through the respective-phase lower-arm shunt resistances on the basis of respective-phase lower-arm voltages, wherein overcurrent detection is performed on each phase current using either one of the overcurrent detection result of the first overcurrent detection unit and the overcurrent detection result of the second overcurrent detection unit.

20 Claims, 13 Drawing Sheets

(51) Int. Cl.
| | | |
|---|---|---|
| H02M 1/32 | (2007.01) | |
| H02M 7/5387 | (2007.01) | |
| F04D 25/06 | (2006.01) | |
| F04D 25/08 | (2006.01) | |
| F25B 31/02 | (2006.01) | |
| H02H 7/10 | (2006.01) | |
| H02M 7/537 | (2006.01) | |
| H02P 27/06 | (2006.01) | |
| H02M 1/00 | (2006.01) | |
| F25B 49/02 | (2006.01) | |
| H02H 3/08 | (2006.01) | |
| H02H 7/122 | (2006.01) | |

(52) U.S. Cl.
CPC ............. *H02H 7/10* (2013.01); *H02M 1/32* (2013.01); *H02M 7/537* (2013.01); *H02M 7/53871* (2013.01); *H02P 27/06* (2013.01); *F25B 49/025* (2013.01); *F25B 2600/021* (2013.01); *H02H 3/08* (2013.01); *H02H 7/1227* (2013.01); *H02M 2001/0009* (2013.01); *Y02B 30/741* (2013.01)

(58) Field of Classification Search
CPC ......... H02H 7/1227; H02H 7/22; H02M 1/32; H02M 7/537; H02M 7/53871; H02M 2001/0009; Y02B 30/741
USPC .......................................... 318/504, 139, 494
See application file for complete search history.

(56) References Cited

U.S. PATENT DOCUMENTS

| | | | | |
|---|---|---|---|---|
| 5,375,028 | A | | 12/1994 | Fukunaga |
| 7,439,700 | B2 | * | 10/2008 | Shimojo ................. F02D 13/02 123/478 |
| 7,675,763 | B2 | * | 3/2010 | Okuda .................... H01L 23/34 323/276 |
| 8,933,653 | B2 | * | 1/2015 | Ichikawa ................. H02P 6/00 318/139 |
| 8,963,479 | B2 | * | 2/2015 | Suzuki ................. H02P 27/085 318/599 |
| 8,964,429 | B2 | * | 2/2015 | Horie ..................... H02M 1/32 363/55 |

FOREIGN PATENT DOCUMENTS

| | | | | |
|---|---|---|---|---|
| JP | H09-093948 A | | 4/1997 | |
| JP | 2003-209976 A | | 7/2003 | |
| JP | 2005-033875 A | | 2/2005 | |
| JP | 2005-304176 A | | 10/2005 | |
| JP | 2006-067747 A | | 3/2006 | |
| JP | 2006067747 A | * | 3/2006 | ............. H02M 7/48 |
| JP | 2006-101685 A | | 4/2006 | |
| JP | 2007-236188 A | | 9/2007 | |
| JP | 2011-045218 A | | 3/2011 | |
| JP | 2011-050183 A | | 3/2011 | |

* cited by examiner (a)

(b)

|  | 3a | 3b | 3c |
|---|---|---|---|
| V0 | 0 | 0 | 0 |
| V1 | 1 | 0 | 0 |
| V2 | 0 | 1 | 0 |
| V3 | 0 | 0 | 1 |
| V4 | 1 | 1 | 0 |
| V5 | 0 | 1 | 1 |
| V6 | 1 | 0 | 1 |
| V7 | 1 | 1 | 1 |

POWER CONVERSION DEVICE, MOTOR DRIVE DEVICE INCLUDING POWER CONVERSION DEVICE, AIR BLOWER AND COMPRESSOR INCLUDING MOTOR DRIVE DEVICE, AND AIR CONDITIONER, REFRIGERATOR, AND FREEZER INCLUDING AIR BLOWER AND COMPRESSOR

CROSS REFERENCE TO RELATED APPLICATION

This application is a U.S. national stage application of International Patent Application No. PCT/JP2013/060619 filed on Apr. 8, 2013, the disclosure of which is incorporated herein by reference.

TECHNICAL FIELD

The present invention relates to a power conversion device, a motor drive device including the power conversion device, an air blower and a compressor including the motor drive device, and an air conditioner, a refrigerator, and a freezer including the air blower and the compressor.

BACKGROUND

A power conversion device generates and supplies three-phase AC voltages to a load by combining ON/OFF states of switching elements that constitute a PWM three-phase inverter. In this power conversion device, respective-phase currents that flow through a three-phase load such as a motor are detected, and the load is controlled on the basis of the detected respective-phase currents.

As a unit that detects the respective-phase currents that flow through the three-phase load, a current sensor or a shunt resistance is provided, which is connected in series to the switching elements that constitute the inverter. As a configuration including a shunt resistance, a power-supply shunt resistance is provided that detects a current between a DC power supply and an inverter device or a lower-arm shunt resistance that detects a phase current of the corresponding phase is provided between a lower-arm switching element and the negative side of the DC power supply. With the configuration including the power-supply shunt resistance or the lower-arm shunt resistance, it is necessary to specify a detected phase current in each phase. This complicates the control software. Further, with the configuration including the power-supply shunt resistance, when a current for a single phase can only be detected, it is necessary to adjust the energization in order to detect currents for two phases. That is, in one switching cycle, the period for detecting each phase current is limited to a narrow range. Therefore, an inverter device is disclosed that can detect a phase current using simple control software that does not need to specify a detected current in each phase, to adjust energization, or to detect a current in a time-series manner, for example, by means of "providing a power-supply shunt resistance and lower-arm shunt resistances for at least two phases and detecting, by using the power-supply shunt resistance, a phase current that cannot be detected by the lower-arm shunt resistances" (for example, Patent Literature 1).

PATENT LITERATURE

Patent Literature 1: Japanese Patent Application Laid-open No. 2006-67747

In order to protect an inverter and a load device and ensure their operational reliability, it is required to immediately perform overcurrent detection on each phase current and stop the inverter. Therefore, it is desirable for overcurrent detection on each phase current to use an overcurrent detection method that does not involve a computation process. However, in the above technique described in Patent Literature 1, phase-current detection is performed by a lower-arm shunt resistance, and whether a phase current can be detected is determined. Thereafter, when a phase current cannot be detected by the lower-arm shunt resistance, then a phase current is detected by a power-supply shunt resistance, and further the phase current is calculated using multiple detection values. This results in a problem in that, from the occurrence of overcurrent up until the inverter is stopped, a certain amount of time is necessary for performing a determination process and a computation process.

SUMMARY

The present invention has been achieved in view of the above problems, and an object of the present invention is to provide a power conversion device that achieves an extended overcurrent detection period and a simplified overcurrent detection procedure for a phase current and that can improve operational reliability of an inverter and a load device.

In order to solve the above problems and achieve the object, a power conversion device according to an aspect of the present invention is a power conversion device that converts DC power supplied from a DC power supply to three-phase AC power and that supplies the AC power to a load device, including: an inverter that is configured by connecting arms for three phases in parallel, each of the arms including an upper-arm switching element and a lower-arm switching element; a power-supply shunt resistance that is provided between the inverter and a negative-voltage side of the DC power supply; respective-phase lower-arm shunt resistances that are provided between the power-supply shunt resistance and the respective-phase lower-arm switching elements, respectively; a first overcurrent detection unit to perform overcurrent detection on a current that flows through the power-supply shunt resistance on a basis of a power-supply shunt-resistance voltage that is a voltage between the negative-voltage side of the DC power supply and a connection point where the power-supply shunt resistance and the respective-phase lower-arm shunt resistances are connected; a second overcurrent detection unit to perform overcurrent detection on each current that flows through the respective-phase lower-arm shunt resistances on a basis of respective-phase lower-arm voltages that are voltages between the negative-voltage side of the DC power supply and connection points where the respective-phase lower-arm switching elements and the respective-phase lower-arm shunt resistances are connected; a control unit to generate six drive signals that correspond to the respective-phase upper-arm switching elements and the respective-phase lower-arm switching elements, perform overcurrent detection on respective-phase currents that flow through the load device by using either one of an overcurrent detection result of the first overcurrent detection unit and an overcurrent detection result of the second overcurrent detection unit, and stop outputting the drive signals upon detecting overcurrent of the respective-phase currents; and a drive unit to drive the respective-phase upper-arm switching elements and the respective-phase lower-arm switching elements on a basis of the drive signals.

According to the present invention, an effect is obtained where an extended overcurrent detection period and a simplified overcurrent detection procedure for a phase current can be achieved and operational reliability of an inverter and a load device can be improved.

DETAILED DESCRIPTION

A power conversion device according to exemplary embodiments of the present invention will be explained below with reference to the accompanying drawings. The present invention is not limited to the embodiments.

Embodiment.

Figure 1:
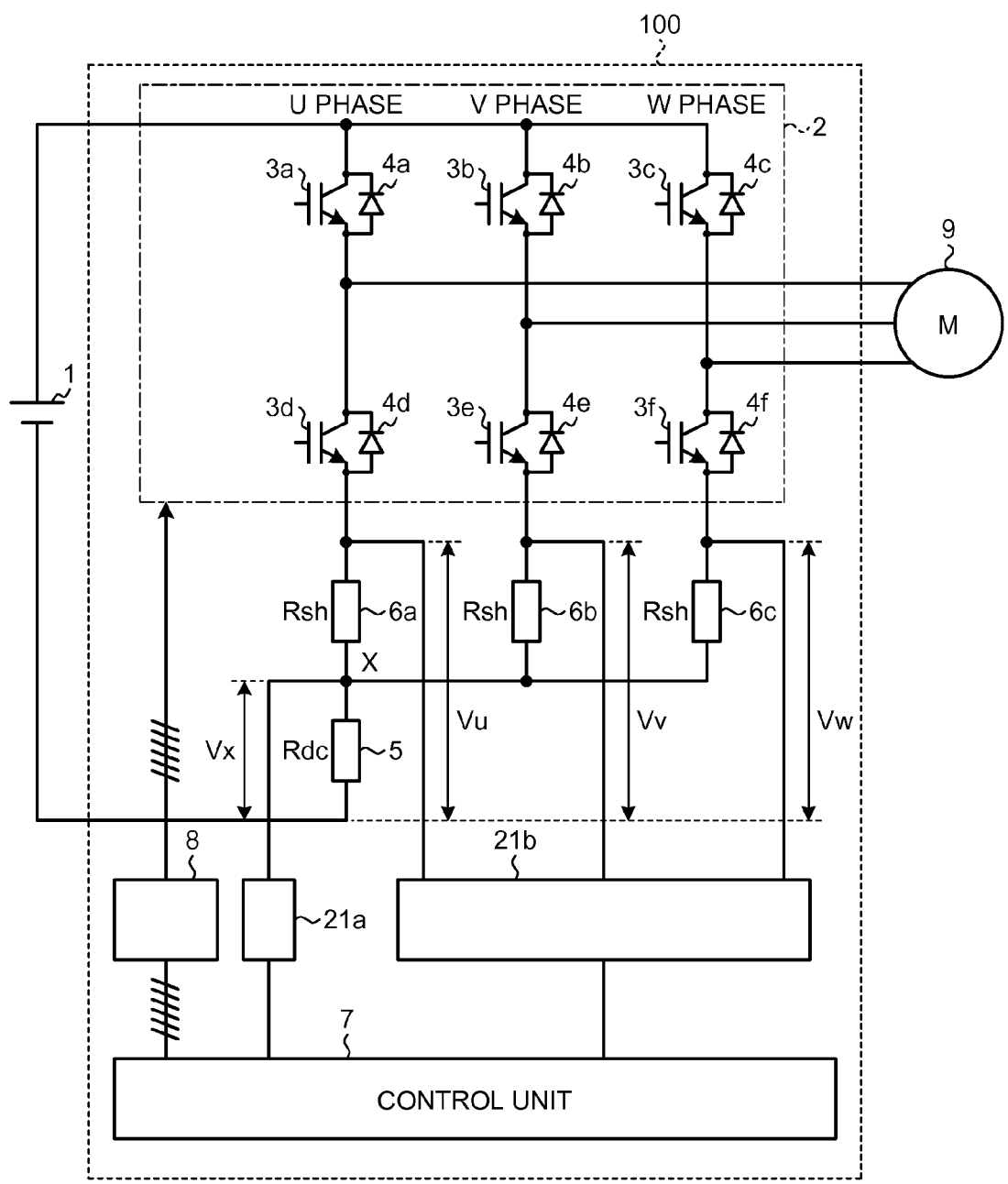
FIG. 1 is a diagram illustrating a configuration example of a power conversion device according to a first embodiment.

FIG. 1 is a diagram illustrating a configuration example of a power conversion device according to a first embodiment. In the example illustrated in FIG. 1, a power conversion device 100 according to the present embodiment is configured to convert DC power supplied from a DC power supply 1 to three-phase AC power to be supplied to a load device (a motor in the example illustrated in FIG. 1) 9.

As illustrated in FIG. 1, the power conversion device 100 includes an inverter 2, a control unit 7, and a drive unit 8 as the main constituent elements for supplying three-phase AC power to the load device 9. The inverter 2 is configured from three arms made up of upper-arm switching elements 3a to 3c (in this example, 3a: a U-phase, 3b: a V-phase, and 3c: a W-phase) and lower-arm switching elements 3d to 3f (in this example, 3d: a U-phase, 3e: a V-phase, and 3f: a W-phase). The control unit 7 generates six drive signals that correspond to the respective-phase upper-arm switching elements 3a to 3c and the respective-phase lower-arm switching elements 3d to 3f, and outputs these six drive signals to the respective-phase upper-arm switching elements 3a to 3c and the respective-phase lower-arm switching elements 3d to 3f. The drive unit 8 drives the respective-phase upper-arm switching elements 3a to 3c and the respective-phase lower-arm switching elements 3d to 3f on the basis of the respective drive signals. The respective-phase upper-arm switching elements 3a to 3c and the respective-phase lower-arm switching elements 3d to 3f are configured to include freewheeling diodes 4a to 4f, each of which is connected in anti-parallel (in this example, 4a: a U-phase upper arm, 4b: a V-phase upper arm, 4c: a W-phase upper arm, 4d: a U-phase lower arm, 4e: a V-phase lower arm, and 4f: a W-phase lower arm).

The control unit 7 is configured, for example, from a microcomputer or a CPU. The control unit 7 is a computation and control unit that converts an input analog voltage signal to a digital value to perform computations and execute control according to a control application of the load device 9.

The power conversion device 100 according to the first embodiment further includes a power-supply shunt resistance 5, respective-phase lower-arm shunt resistances 6a, 6b, and 6c (in this example, 6a: a U-phase, 6b: a V-phase, and 6c: a W-phase), a first overcurrent detection unit 21a, and a second overcurrent detection unit 21b. The power-supply shunt resistance 5 is provided between the inverter 2 and the negative-voltage side of the DC power supply 1. The respective-phase lower-arm shunt resistances 6a, 6b, and 6c are provided between the power-supply shunt resistance 5 and the respective-phase lower-arm switching elements 3d, 3e, and 3f. The first overcurrent detection unit 21a performs overcurrent detection on a current that flows through the power-supply shunt resistance 5 on the basis of the voltage (hereinafter, "power-supply shunt-resistance voltage") Vx between the negative-voltage side (the reference potential) of the DC power supply 1 and the connection point (the X point illustrated in FIG. 1) where the power-supply shunt resistance 5 and the respective-phase lower-arm shunt resistances 6a, 6b, and 6c are connected. The second overcurrent detection unit 21b performs overcurrent detection on each current that flows through the respective-phase lower-arm shunt resistances 6a, 6b, and 6c on the basis of the voltages (hereinafter, "respective-phase lower-arm voltages") Vu, Vv, and Vw between the negative-voltage side (the reference potential) of the DC power supply 1 and the connection points where the respective-phase lower-arm switching elements 3d, 3e, and 3f and the respective-phase lower-arm shunt resistances 6a, 6b, and 6c are connected. In the example illustrated in FIG. 1, the resistance value of the power-supply shunt resistance 5 is represented as Rdc, and the resistance value of the respective-phase lower-arm shunt resistances 6a, 6b, and 6c is represented as Rsh.

Figure 2:
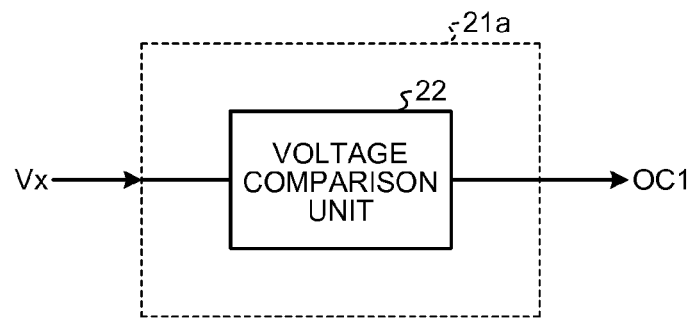
FIG. 2 is a diagram illustrating a configuration example of a first overcurrent detection unit in the power conversion device according to the first embodiment.

FIG. 2 is a diagram illustrating a configuration example of a first overcurrent detection unit in the power conversion device according to the first embodiment. As illustrated in FIG. 2, the first overcurrent detection unit 21a is configured to include a voltage comparison unit 22.

In the voltage comparison unit 22, a first threshold value V1 for the power-supply shunt-resistance voltage Vx is set in advance. When the power-supply shunt-resistance voltage Vx is equal to or less than the first threshold value V1 (Vx≤V1), the voltage comparison unit 22 outputs a value (a Hi output in this example) to the control unit 7 as an OC1 output, with the value indicating that the current value of the current that flows through the power-supply shunt resistance 5 is normal. When the power-supply shunt-resistance voltage Vx is greater than the first threshold value V1 (Vx>V1), the voltage comparison unit 22 outputs a value (a Lo output in this example) to the control unit 7 as the OC1 output, with the value indicating that overcurrent flows through the power-supply shunt resistance 5.

This first overcurrent detection unit 21a can be configured to include, at the previous stage of the voltage comparison unit 22, an amplification unit that amplifies the power-supply shunt-resistance voltage Vx to a voltage value Vx', which is easily processed by the control unit 7. In this case, it is satisfactory that when the voltage value Vx' is equal to or less than a preset first threshold value V1' (Vx'≤V1'), the voltage comparison unit 22 outputs a value (a Hi output in this example) to the control unit 7 as the OC1 output, with the value indicating that the current value of the current that flows through the power-supply shunt resistance 5 is normal. It is also satisfactory that when the voltage value Vx' is greater than the first threshold value V1' (Vx'>V1'), the voltage comparison unit 22 outputs a value (a Lo output in this example) to the control unit 7 as the OC1 output, with the value indicating that overcurrent flows through the power-supply shunt resistance 5.

Figure 3:
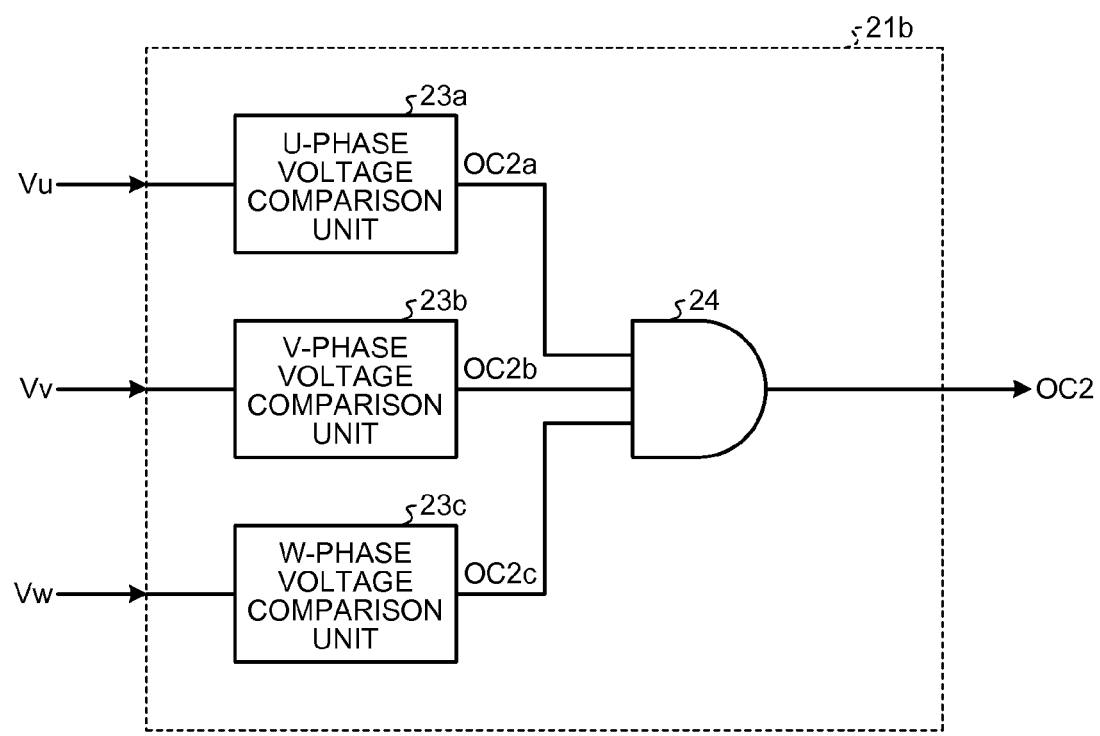
FIG. 3 is a diagram illustrating a configuration example of a second overcurrent detection unit in the power conversion device according to the first embodiment.

FIG. 3 is a diagram illustrating a configuration example of a second overcurrent detection unit in the power conversion device according to the first embodiment. As illustrated in FIG. 3, the second overcurrent detection unit 21b is configured to include respective-phase voltage comparison units 23a, 23b, and 23c and an AND operation unit 24.

In the respective-phase voltage comparison units 23a, 23b, and 23c, a second threshold value V2 and a third threshold value V3, which is greater than this second threshold value V2, for the respective-phase lower-arm voltages Vu, Vv, and Vw are set in advance. When the respective-phase lower-arm voltages Vu, Vv, and Vw are equal to or greater than the second threshold value V2 and equal to or less than the third threshold value V3 (V2≤Vu, Vv, and Vw≤V3), the respective-phase voltage comparison units 23a, 23b, and 23c output a value (a Hi output in this example) as OC2a, OC2b, and OC2c, with the value indicating that the current value of each current that flows through the respective-phase lower-arm shunt resistances 6a, 6b, and 6c is normal. When the respective-phase lower-arm voltages Vu, Vv, and Vw are less than the second threshold value V2 (Vu, VV, and Vw<V2) or greater than the third threshold value V3 (Vu, Vv, Vw>V3), the respective-phase voltage comparison units 23a, 23b, and 23c output a value (a Lo output in this example) as OC2a, OC2b, and OC2c, with the value indicating that overcurrent flows through the respective-phase lower-arm shunt resistances 6a, 6b, and 6c.

In the respective-phase voltage comparison units 23a, 23b, and 23c, two comparator circuits, for example, are provided for each phase. It is satisfactory that in one of the comparators, the respective-phase lower-arm voltages Vu, Vv, and Vw are compared with the second threshold value V2, while in the other comparator, the respective-phase lower-arm voltages Vu, Vv, and Vw are compared with the third threshold value V3, and then a logical operation is performed on the outputs of the comparators to output the results of the logical operation as OC2a, OC2b, and OC2c.

This second overcurrent detection unit 21b can be configured to include, at the previous stage of the respective-phase voltage comparison units 23a, 23b, and 23c, an amplification unit that amplifies the respective-phase lower-arm voltages Vu, Vv, and Vw to voltage values Vu', Vv', and Vw', which are easily processed by the control unit 7. When a current flows through the freewheeling diodes 4d, 4e, and 4f of the respective-phase lower-arm switching elements 3d, 3e, and 3f, the respective-phase lower-arm voltages Vu, Vv, and Vw become lower than the negative-voltage side (the reference potential) of the DC power supply 1. Thus, when the negative-voltage side (the reference potential) of the DC power supply 1 is GND, the respective-phase lower-arm voltages Vu, Vv, and Vw become negative. Therefore, the second overcurrent detection unit 21b can be configured to further include a voltage-level shift unit. In this case, it is satisfactory that when the voltage values Vu', Vv', and Vw' are equal to or greater than a preset second threshold value V2' and equal to or less than a preset third threshold value V3' (V2'≤Vu', Vv', and Vw'≤V3'), the second overcurrent detection unit 21b outputs a value (a Hi output in this example) as OC2a, OC2b, and OC2c, with the value indicating that the current value of each current that flows through the respective-phase lower-arm shunt resistances 6a, 6b, and 6c is normal. It is also satisfactory that when the respective-phase lower-arm voltages Vu', Vv', and Vw' are less than the second threshold value V2' (Vu', VV', and Vw'<V2') or greater than the third threshold value V3' (Vu', Vv', and Vw'>V3'), the second overcurrent detection unit 21b outputs a value (a Lo output in this example) as OC2a, OC2b, and OC2c, with the value indicating that overcurrent flows through the respective-phase lower-arm shunt resistances 6a, 6b, and 6c.

In the AND operation unit 24, when all the outputs OC2a, OC2b, and OC2c of the respective-phase voltage comparison units 23a, 23b, and 23c are a value (a Hi output in this example) indicating that the value of each current that flows through the respective-phase lower-arm shunt resistances 6a, 6b, and 6c is normal, then the AND operation unit 24 outputs a value (a Hi output in this example) as OC2 to the control unit 7, with the value indicating that all the current values of each current that flows through the respective-phase lower-arm shunt resistances 6a, 6b, and 6c are normal. When any one or more of the outputs OC2a, OC2b, and OC2c of the respective-phase voltage comparison units 23a, 23b, and 23c are a value (a Lo output in this example) indicating that overcurrent flows through the respective-phase lower-arm shunt resistances 6a, 6b, and 6c, then the AND operation unit 24 outputs a value (a Lo output in this example) as OC2 to the control unit 7, with the value indicating that overcurrent flows through any one or more of the respective-phase lower-arm shunt resistances 6a, 6b, and 6c.

Figure 4:
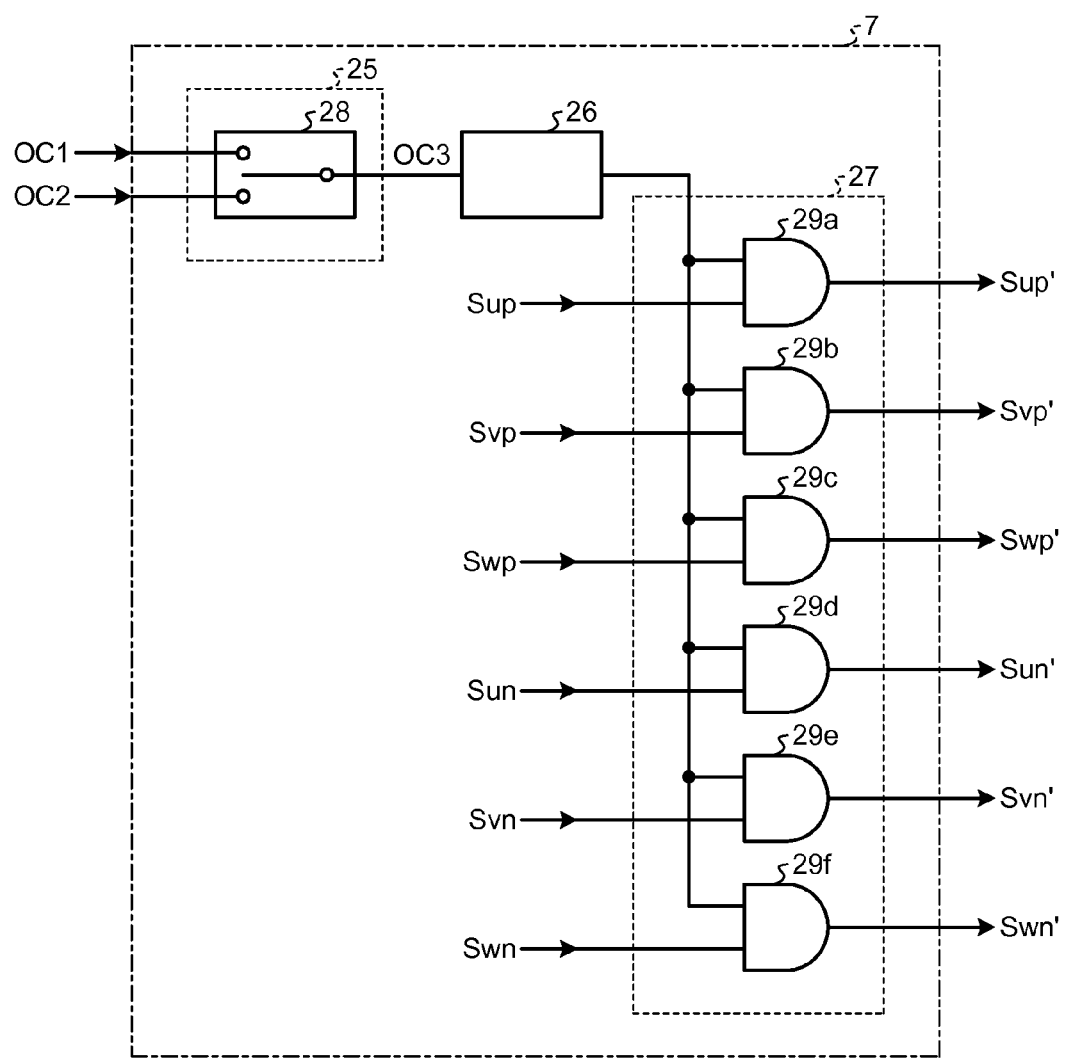
FIG. 4 is a diagram illustrating a configuration example of a control unit of the power conversion device according to the first embodiment.

FIG. 4 is a diagram illustrating a configuration example of a control unit of the power conversion device according to the first embodiment. The control unit 7 of the power conversion device 100 according to the first embodiment includes an overcurrent-detection-result switching unit 25, a state holding unit 26, and an inverter-drive stopping unit 27, in addition to the constituent elements (not illustrated) for generating the above drive signals Sup, Sun, Svp, Svn, Swp, and Swn, which correspond to the respective-phase upper-arm switching elements 3a to 3c and the respective-phase lower-arm switching elements 3d to 3f. The overcurrent-detection-result switching unit 25 switches between the overcurrent detection result of the first overcurrent detection unit 21a and the overcurrent detection result of the second overcurrent detection unit 21b to output the overcurrent detection result. The state holding unit 26 holds therein the output of the overcurrent-detection-result switching unit 25. When the state holding unit 26 outputs a value (a Lo output in this example) indicating that overcurrent flows through the power-supply shunt resistance 5 or through any of the respective-phase lower-arm shunt resistances 6a, 6b, and 6c, the inverter-drive stopping unit 27 stops outputting drive signals to the respective-phase upper-arm switching elements 3a to 3c and the respective-phase lower-arm switching elements 3d to 3f that constitute the inverter 2.

As illustrated in FIG. 4, the overcurrent-detection-result switching unit 25 is configured to include a switch unit 28. This switch unit 28 switches between the output OC1, which is the overcurrent detection result of the first overcurrent detection unit 21a, and the output OC2, which is the overcurrent detection result of the second overcurrent detection unit 21b, according to the output-voltage vector of the inverter 2 described later, and outputs the overcurrent detection result as OC3.

The state holding unit 26 is configured by a latch circuit, for example. In the state holding unit 26, during the period within which the output OC3 of the overcurrent-detection-result switching unit 25 is a value (a Hi output in this example) indicating that the current value of the current that flows through the power-supply shunt resistance 5 or the current value of each current that flows through the respective-phase lower-arm shunt resistances 6a, 6b, and 6c, is normal, a value identical to the output value OC3 (a Hi output in this example) of the overcurrent-detection-result switching unit 25 is maintained. At the point in time when the output OC3 of the overcurrent-detection-result switching unit 25 becomes a value (a Lo output in this example) indicating that overcurrent flows through the power-supply shunt resistance 5 or through any of the respective-phase lower-arm shunt resistances 6a, 6b, and 6c, the state holding unit 26 holds therein a value identical to the output value OC3 (a Lo output in this example) of the overcurrent-detection-result switching unit 25.

As illustrated in FIG. 4, the inverter-drive stopping unit 27 is configured to include AND operation units 29a, 29b, 29c, 29d, 29e, and 29f. During the period within which the output OC3 of the overcurrent-detection-result switching unit 25, held in the state holding unit 26, is a value (a Hi output in this example) indicating that the current value of the current that flows through the power-supply shunt resistance 5 or the current value of each current that flows through the respective-phase lower-arm shunt resistances 6a, 6b, and 6c, is normal, the AND operation units 29a, 29b, 29c, 29d, 29e, and 29f output the respective drive signals Sup, Svp, Swp, Sun, Svn, and Swn. At the point in time when the output OC3 of the overcurrent-detection-result switching unit 25 becomes a value (a Lo output in this example) indicating that overcurrent flows through the power-supply shunt resistance 5 or through any of the respective-phase lower-arm shunt resistances 6a, 6b, and 6c, the AND operation units 29a, 29b, 29c, 29d, 29e, and 29f stop outputting the respective drive signals Sup, Svp, Swp, Sun, Svn, and Swn.

The present invention is not limited to the above configurations of the first overcurrent detection unit 21a, the second overcurrent detection unit 21b, and the control unit 7 or to the above control method.

Figure 5:
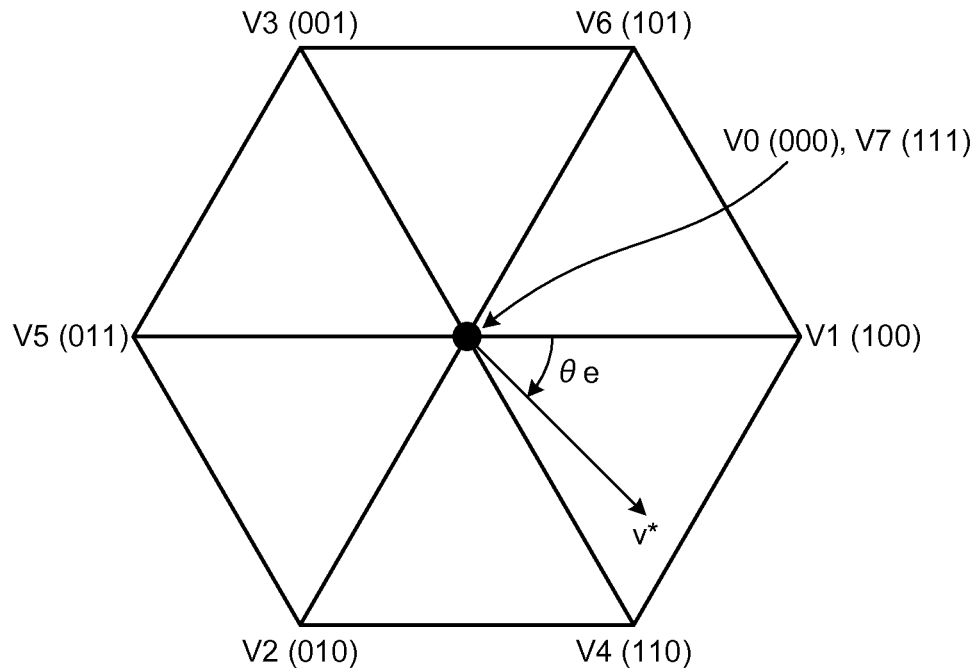
FIG. 5 is a diagram illustrating the relation between an inverter output-voltage vector and the ON/OFF state of respective-phase upper-arm switching elements in a space-vector modulation method.

Next, a PWM space-vector modulation method is described. FIG. 5 illustrates the relation between an inverter output-voltage vector and the ON/OFF state of respective-phase upper-arm switching elements in the space-vector modulation method. FIG. 5(a) is a schematic diagram illustrating the relation between an output-voltage vector of the inverter 2 and the ON/OFF state of the respective-phase upper-arm switching elements 3a to 3c. FIG. 5(b) illustrates the definition of the output-voltage vector of the inverter 2. In the example illustrated in FIG. 5, the ON state of the respective-phase upper-arm switching elements 3a to 3c is defined as "1" and the OFF state of the respective-phase upper-arm switching elements 3a to 3c is defined as "0".

As illustrated in FIG. 5, there are two patterns: the ON state (that is, "1") and the OFF state (that is, "0"), as in the ON/OFF state of the respective-phase upper-arm switching elements 3a to 3c. When corresponding to the combination of the ON/OFF states of the respective-phase upper-arm switching elements 3a to 3c, the output-voltage vector of the inverter 2 is defined in the configuration of ((a state of the U-phase upper-arm switching element 3a) (a state of the V-phase upper-arm switching element 3b) (a state of the W-phase upper-arm switching element 3c)), then there are eight patterns: V0(000), V1(100), V2(010), V3(001), V4(110), V5(011), V6(101), and V7(111). Among these inverter output-voltage vectors, the vectors V0(000) and V7(111) with no magnitude are referred to as a "zero vector", and the other vectors V1(100), V2(010), V3(001), V4(110), V5(011), and V6(101) with the same magnitude and a phase difference of 60 degrees from each other are referred to as a "real vector".

As described above, the inverter output-voltage vector in the PWM space-vector modulation method is made up of the zero vectors V0 and V7 with no magnitude and the real vectors V1 to V6 with the same magnitude and a phase difference of 60° from each other. These eight patterns of output-voltage vector are merged in any combination to generate three-phase PWM voltages that correspond to the respective-phase upper-arm switching elements 3a to 3c and the respective-phase lower-arm switching elements 3d to 3f.

In order to protect the inverter 2 and the load device 9 and ensure their operational reliability, it is required to immediately perform overcurrent detection on each phase current and stop the inverter 2. Therefore, it is desirable for overcurrent detection on each phase current to use an overcurrent detection method that does not involve a computation process.

Figure 6:
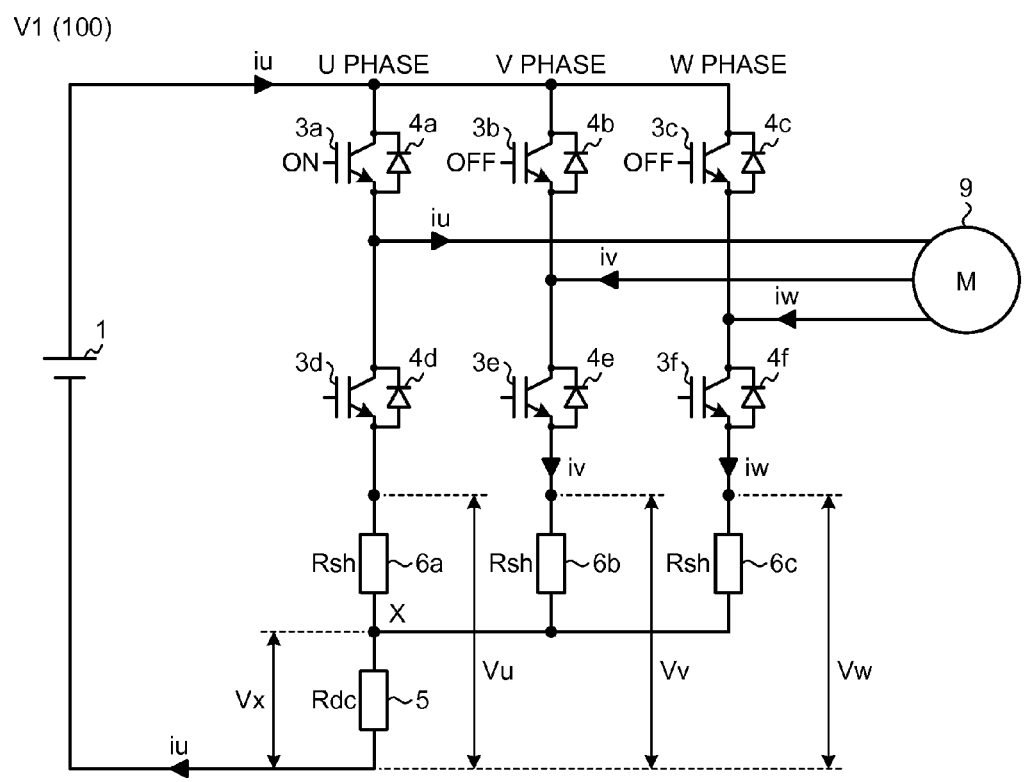
FIG. 6 is a diagram illustrating a current that flows through each section of an inverter when the inverter output-voltage vector is a real vector V1(100).

FIG. 6 is a diagram illustrating a current that flows through each section of an inverter when the inverter output-voltage vector is the real vector V1(100). In the example illustrated in FIG. 6, each of the respective-phase currents iu, iv, and iw that flow from the higher-potential side to the lower-potential side of the respective-phase windings of the load device (the motor in this example) 9 is described as a positive value. In the examples illustrated in the following diagrams, the respective-phase currents iu, iv, and iw are described in the same manner as in FIG. 6.

As illustrated in FIG. 6, when the output-voltage vector of the inverter 2 is the real vector V1(100), the U-phase current iu flows from the positive-voltage side of the DC power supply 1 through the U-phase upper-arm switching element 3a toward the motor 9. The V-phase current iv flows from the motor 9 through the V-phase lower-arm switching element 3e, the V-phase lower-arm shunt resistance 6b, and the power-supply shunt resistance 5 toward the negative-voltage side of the DC power supply 1. The W-phase current iw flows from the motor 9 through the W-phase lower-arm switching element 3f, the W-phase lower-arm shunt resistance 6c, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (1), (2), and (3).

$$Vu=Vx=iu\times Rdc \quad (1)$$

$$Vv=Vx+iv\times Rsh=iu\times Rdc+iv\times Rsh \quad (2)$$

$$Vw=Vx+iw\times Rsh=iu\times Rdc+iw\times Rsh \quad (3)$$

That is, when the output-voltage vector of the inverter 2 is the real vector V1(100), by detecting the respective-phase lower-arm voltages Vu, Vv, and Vw, the respective-phase currents iu, iv, and iw that flow through the respective-phase lower-arm shunt resistances 6a, 6b, and 6c can be calculated using the above equations (1), (2), and (3).

Further, by detecting the power-supply shunt-resistance voltage Vx, the U-phase current iu that flows through the power-supply shunt resistance 5 can be calculated using the above equation (1).

Figure 7:
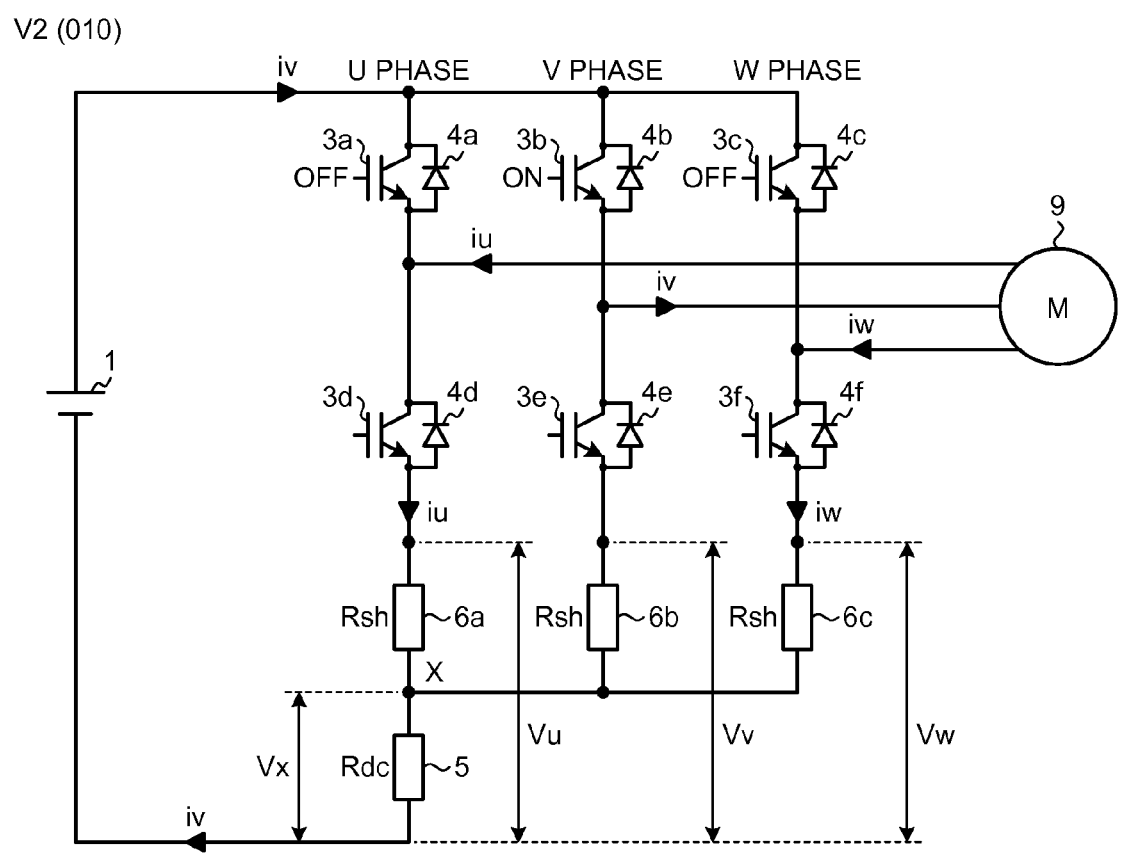
FIG. 7 is a diagram illustrating a current that flows through each section of an inverter when the inverter output-voltage vector is a real vector V2(010).

FIG. 7 is a diagram illustrating a current that flows through each section of an inverter when the inverter output-voltage vector is the real vector V2(010).

As illustrated in FIG. 7, when the output-voltage vector of the inverter 2 is the real vector V2(010), the V-phase current iv flows from the positive-voltage side of the DC power supply 1 through the V-phase upper-arm switching element 3b toward the motor 9. The U-phase current iu flows from the motor 9 through the U-phase lower-arm switching element 3d, the U-phase lower-arm shunt resistance 6a, and the power-supply shunt resistance 5 toward the negative-voltage side of the DC power supply 1. The W-phase current iw flows from the motor 9 through the W-phase lower-arm switching element 3f, the W-phase lower-arm shunt resistance 6c, and the power-supply shunt resistance 5 toward the negative-voltage-side terminal of the DC power supply 1. At this time, the U-phase lower-arm voltage Vu, the V-phase lower-arm voltage Vv, and the W-phase lower-arm voltage Vw can be expressed by the following equations (4), (5), and (6).

$$Vu=Vx+iu\times Rsh=iv\times Rdc+iu\times Rsh \quad (4)$$

$$Vv=Vx=iv\times Rdc \quad (5)$$

$$Vw=Vx+iw\times Rsh=iv\times Rdc+iw\times Rsh \quad (6)$$

That is, when the output-voltage vector of the inverter 2 is the real vector V2(010), by detecting the respective-phase lower-arm voltages Vu, Vv, and Vw, the respective-phase currents iu, iv, and iw that flow through the respective-phase lower-arm shunt resistances 6a, 6b, and 6c can be calculated using the above equations (4), (5), and (6).

Further, by detecting the power-supply shunt-resistance voltage Vx, the V-phase current iv that flows through the power-supply shunt resistance 5 can be calculated using the above equation (5).

Figure 8:
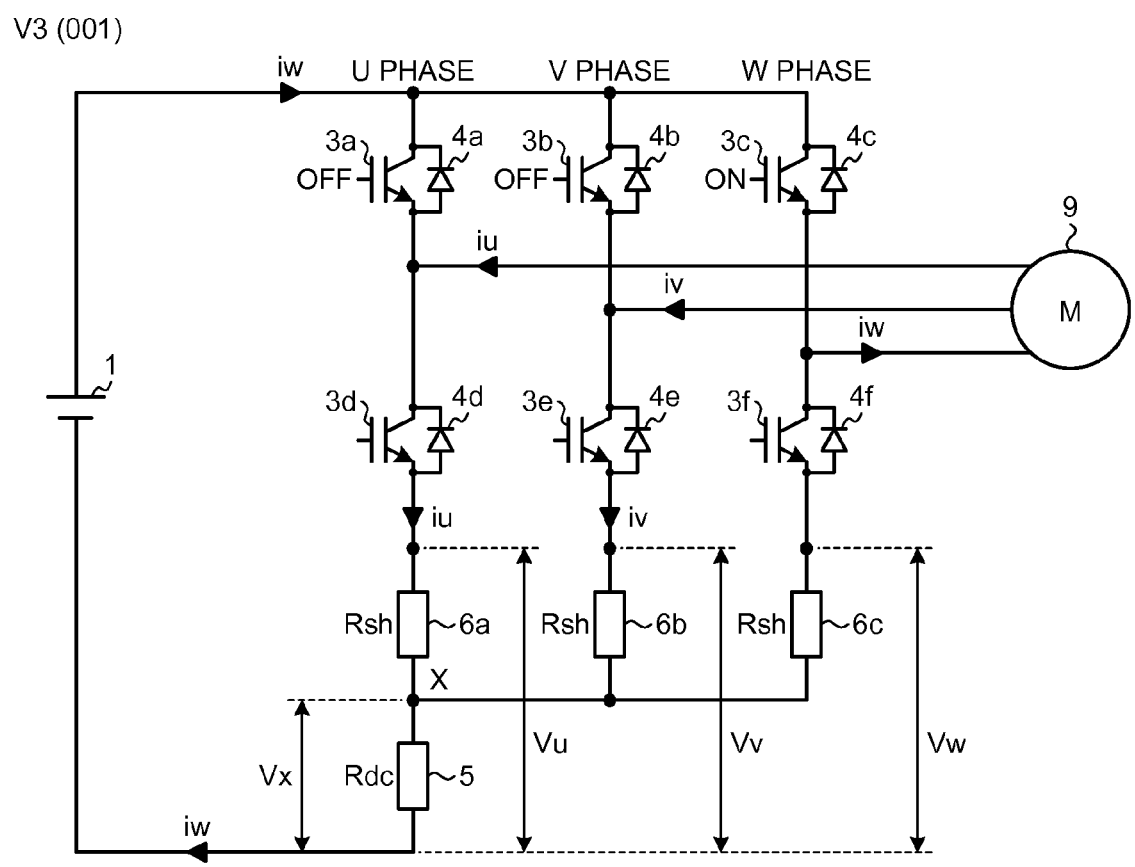
FIG. 8 is a diagram illustrating a current that flows through each section of an inverter when the inverter output-voltage vector is a real vector V3(001).

FIG. 8 is a diagram illustrating a current that flows through each section of an inverter when the inverter output-voltage vector is the real vector V3(001).

As illustrated in FIG. 8, when the output-voltage vector of the inverter 2 is the real vector V3(001), the W-phase current iw flows from the positive-voltage side of the DC power supply 1 through the W-phase upper-arm switching element 3c toward the motor 9. The U-phase current iu flows from the motor 9 through the U-phase lower-arm switching element 3d, the U-phase lower-arm shunt resistance 6a, and the power-supply shunt resistance 5 toward the negative-voltage side of the DC power supply 1. The V-phase current iv flows from the motor 9 through the V-phase lower-arm switching element 3e, the V-phase lower-arm shunt resistance 6b, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (7), (8), and (9).

$$Vu=Vx+iu\times Rsh=iw\times Rdc+iu\times Rsh \quad (7)$$

$$Vv=Vx+iv\times Rsh=iw\times Rdc+iv\times Rsh \quad (8)$$

$$Vw=Vx=iw\times Rdc \quad (9)$$

That is, when the output-voltage vector of the inverter 2 is the real vector V3(001), by detecting the respective-phase lower-arm voltages Vu, Vv, and Vw, the respective-phase currents iu, iv, and iw that flow through the respective-phase lower-arm switching elements 3d to 3f can be calculated using the above equations (7), (8), and (9).

Further, by detecting the power-supply shunt-resistance voltage Vx, the W-phase current iw that flows through the power-supply shunt resistance 5 can be calculated using the above equation (9).

As described above, in the power conversion device 100 according to the present embodiment, when the inverter output-voltage vector is any of the real vectors V1(100), V2(010), and V3(001), it is possible to calculate the respective-phase currents iu, iv, and iw that flow through respective-phase windings of the motor 9 by detecting the U-phase lower-arm voltage Vu, the V-phase lower-arm voltage Vv, and the W-phase lower-arm voltage Vw. However, a certain amount of time is required to calculate these phase currents using multiple detection values, and therefore this calculation method does not suit overcurrent detection, which is required to be immediately performed.

Meanwhile, it is possible to calculate the phase current for a single phase by detecting the power-supply shunt-resistance voltage Vx. The first threshold value V1 for the power-supply shunt-resistance voltage Vx is set. The first threshold value V1 corresponds to the overcurrent detection value of the respective-phase currents iu, iv, and iw. It is therefore possible to perform overcurrent detection by simply detecting the power-supply shunt-resistance voltage Vx and comparing the power-supply shunt-resistance voltage Vx with the first threshold value V1.

Further, because the respective-phase currents iu, iv, and iw are obtained without using Kirchhoff's first law or the phase-current balancing condition, the power conversion device 100 is also applicable to a case where the motor 9 is an unbalanced load.

Figure 9:
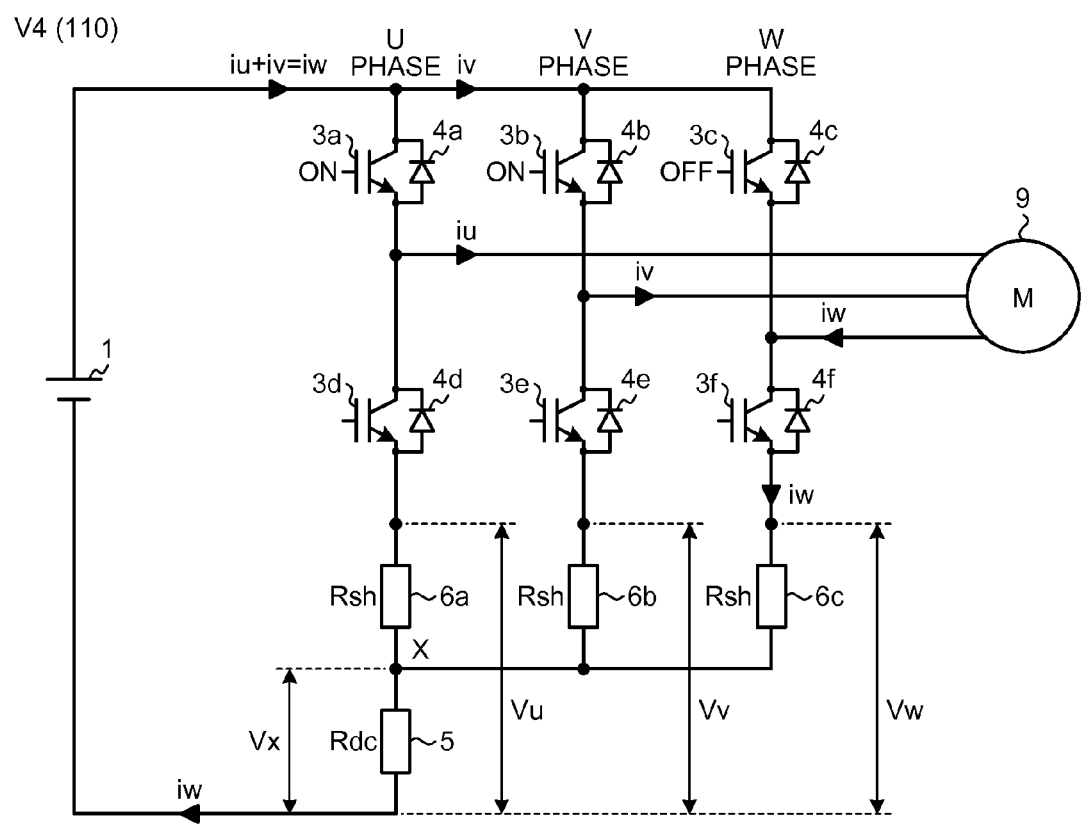
FIG. 9 is a diagram illustrating a current that flows through each section of an inverter when the inverter output-voltage vector is a real vector V4(110).

FIG. 9 is a diagram illustrating a current that flows through each section of an inverter when the inverter output-voltage vector is the real vector V4(110).

As illustrated in FIG. 9, when the output-voltage vector of the inverter 2 is the real vector V4(110), the U-phase current iu flows from the positive-voltage side of the DC power supply 1 through the U-phase upper-arm switching element 3a toward the motor 9, and the V-phase current iv flows from the positive-voltage side of the DC power supply 1 through the V-phase upper-arm switching element 3b toward the motor 9. The W-phase current iw flows from the motor 9 through the W-phase lower-arm switching element 3f, the W-phase lower-arm shunt resistance 6c, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (10), (11), and (12).

$$Vu=Vx=iw\times Rdc \tag{10}$$

$$Vv=Vx=iw\times Rdc \tag{11}$$

$$Vw=Vx+iw\times Rsh=iw\times Rdc+iw\times Rsh \tag{12}$$

When the motor 9 is a three-phase balanced load, the following equations hold under the phase-current balancing condition.

$$iu+iv=iw \tag{13}$$

$$iu=iv=(1/2)iw \tag{14}$$

That is, when the output-voltage vector of the inverter 2 is the real vector V4(110) and the motor 9 is a three-phase balanced load, then the respective-phase currents iu, iv, and iw can be calculated using any one of the above equations (10), (11), and (12) and using the above equation (14).

Further, by detecting the power-supply shunt-resistance voltage Vx, the W-phase current iw that flows through the power-supply shunt resistance 5 can be calculated using the above equation (10) or (11).

Figure 10:
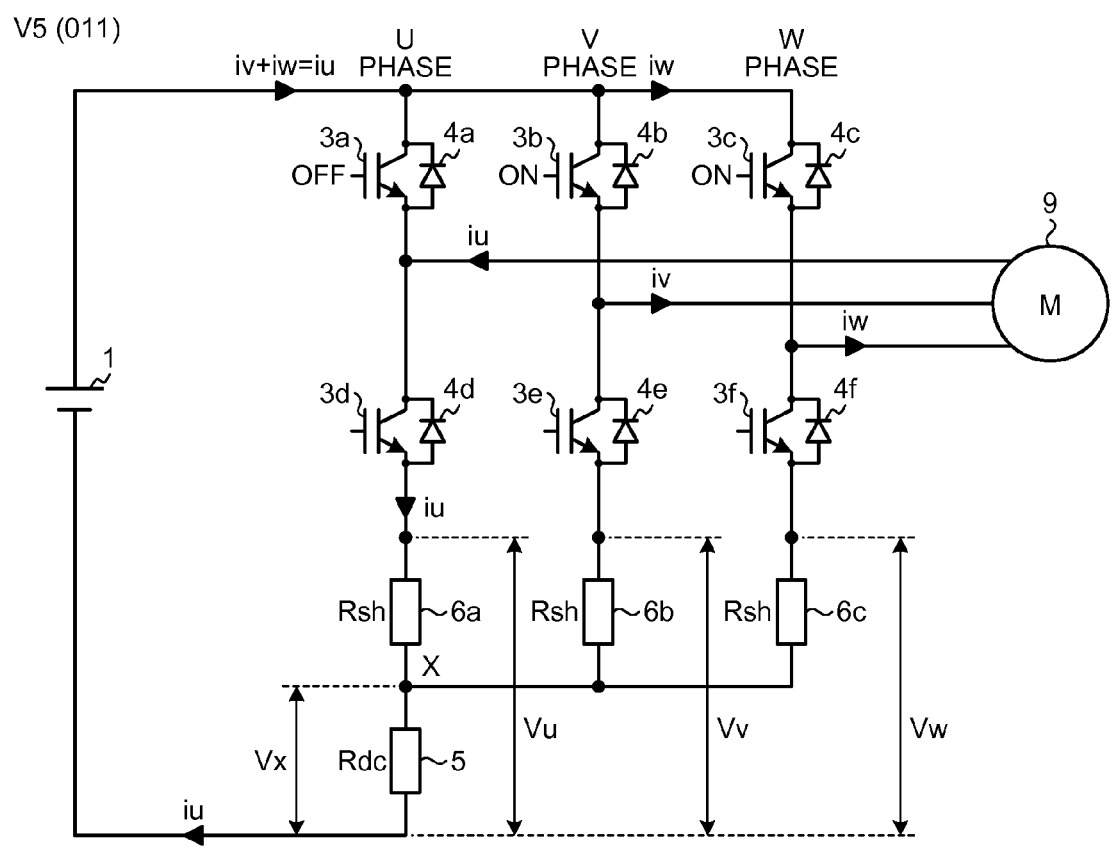
FIG. 10 is a diagram illustrating a current that flows through each section of an inverter when the inverter output-voltage vector is a real vector V5(011).

FIG. 10 is a diagram illustrating a current that flows through each section of an inverter when the inverter output-voltage vector is the real vector V5(011).

As illustrated in FIG. 10, when the output-voltage vector of the inverter 2 is the real vector V5(011), the V-phase current iv flows from the positive-voltage side of the DC power supply 1 through the V-phase upper-arm switching element 3b toward the motor 9, and the W-phase current iw flows from the positive-voltage side of the DC power supply 1 through the W-phase upper-arm switching element 3c toward the motor 9. The U-phase current iu flows from the motor 9 through the U-phase lower-arm switching element 3d, the U-phase lower-arm shunt resistance 6a, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (15), (16), and (17).

$$Vu=Vx+iu\times Rsh=iu\times Rdc+iu\times Rsh \tag{15}$$

$$Vv=Vx=iu\times Rdc \tag{16}$$

$$Vw=Vx=iu\times Rdc \tag{17}$$

When the motor 9 is a three-phase balanced load, the following equations hold under the phase-current balancing condition.

$$iv+iw=iu \tag{18}$$

$$iv=iw=(1/2)iu \tag{19}$$

That is, when the output-voltage vector of the inverter 2 is the real vector V5(011) and the motor 9 is a three-phase balanced load, then the respective-phase currents iu, iv, and iw can be calculated using any one of the above equations (15), (16), and (17) and using the above equation (19).

Further, by detecting the power-supply shunt-resistance voltage Vx, the U-phase current iu that flows through the power-supply shunt resistance 5 can be calculated using the above equation (16) or (17).

Figure 11:
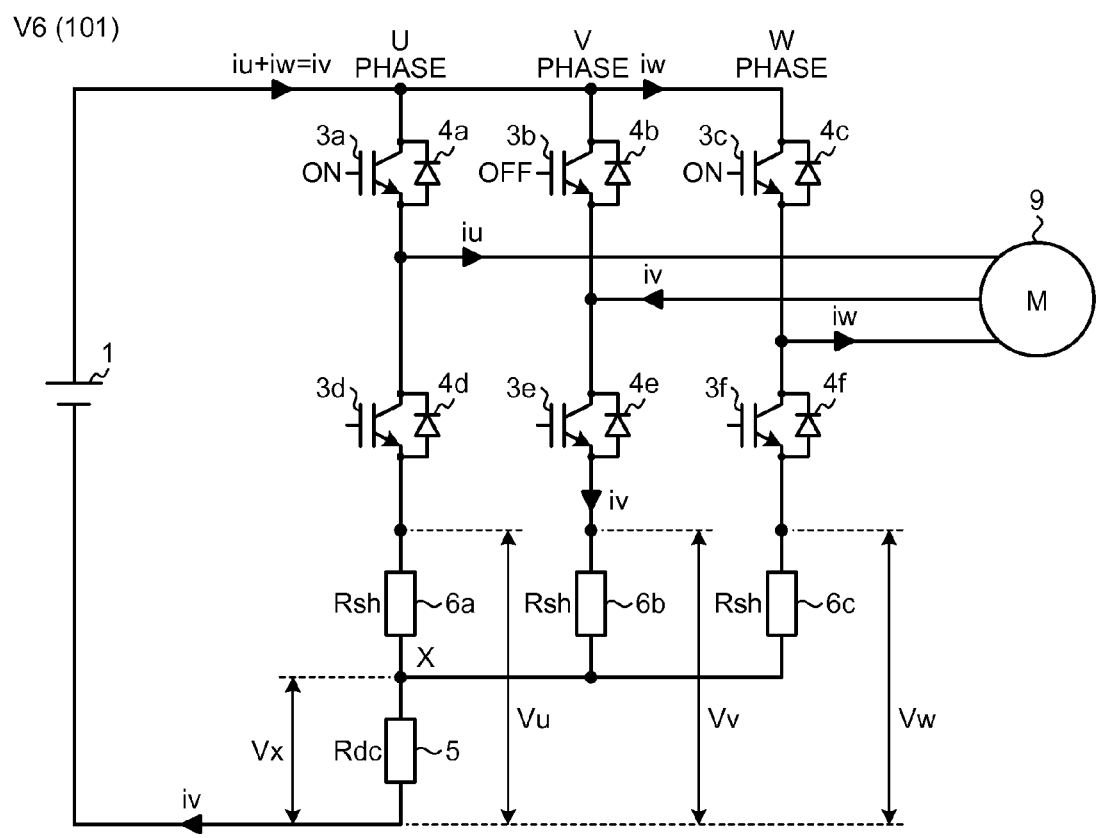
FIG. 11 is a diagram illustrating a current that flows through each section of an inverter when the inverter output-voltage vector is a real vector V6(101).

FIG. 11 is a diagram illustrating a current that flows through each section of an inverter when the inverter output-voltage vector is the real vector V6(101).

As illustrated in FIG. 11, when the output-voltage vector of the inverter 2 is the real vector V6(101), the U-phase current iu flows from the positive-voltage side of the DC power supply 1 through the U-phase upper-arm switching element 3a toward the motor 9, and the W-phase current iw flows from the positive-voltage side of the DC power supply 1 through the W-phase upper-arm switching element 3c toward the motor 9. The V-phase current iv flows from the motor 9 through the V-phase lower-arm switching element 3e, the V-phase lower-arm shunt resistance 6b, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (20), (21), and (22).

$$Vu=Vx=iv\times Rdc \tag{20}$$

$$Vv=Vx+iv\times Rsh=iv\times Rdc+iv\times Rsh \tag{21}$$

$$Vw=Vx=iv\times Rdc \tag{22}$$

When the motor 9 is a three-phase balanced load, the following equations hold under the phase-current balancing condition.

$$iu+iw=iv \tag{23}$$

$$iu=iw=(\tfrac{1}{2})iv \tag{24}$$

That is, when the output-voltage vector of the inverter 2 is the real vector V6(101) and the motor 9 is a three-phase balanced load, then the respective-phase currents iu, iv, and iw can be calculated using any one of the above equations (20), (21), and (22) and using the above equation (24).

Further, by detecting the power-supply shunt-resistance voltage Vx, the V-phase current iv that flows through the power-supply shunt resistance 5 can be calculated using the above equation (20) or (22).

As described above, in the power conversion device 100 according to the present embodiment, in the case where the motor 9 is a three-phase balanced load, even when the inverter output-voltage vector is the real vector V4(110), V5(011), or V6(101), it is still possible to calculate the respective-phase currents iu, iv, and iw that flow through the respective-phase windings of the motor 9 by detecting any one of the U-phase lower-arm voltage Vu, the V-phase lower-arm voltage Vv, and the W-phase lower-arm voltage Vw. However, a certain amount of time is required to calculate these phase currents using multiple detection values, and therefore this calculation method does not suit overcurrent detection, which is required to be immediately performed.

Meanwhile, it is possible to calculate the phase current for a single phase by detecting the power-supply shunt-resistance voltage Vx. The first threshold value V1 for the power-supply shunt-resistance voltage Vx is set. The first threshold value V1 corresponds to the overcurrent detection value of the respective-phase currents iu, iv, and iw. It is therefore possible to perform overcurrent detection by simply detecting the power-supply shunt-resistance voltage Vx and comparing the power-supply shunt-resistance voltage Vx with the first threshold value V1.

Figure 12:
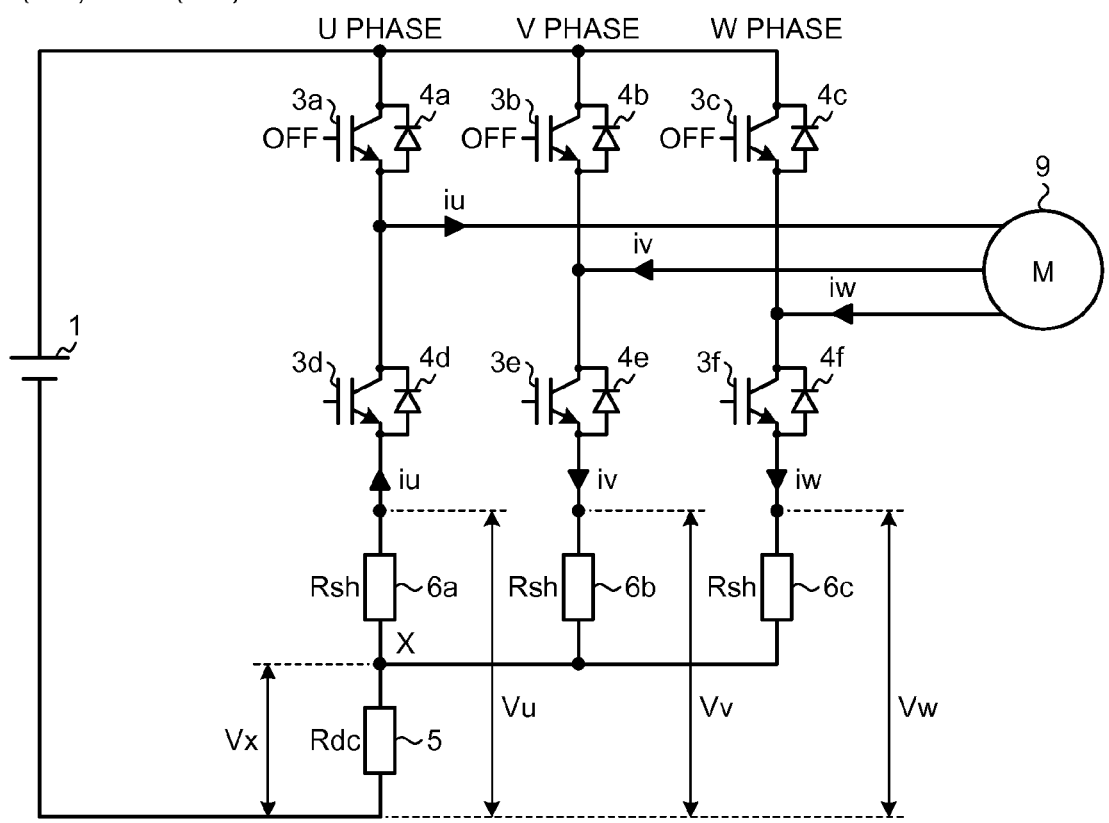
FIG. 12 is a diagram illustrating a current that flows through each section of an inverter when the inverter output-voltage vector is a zero vector V0(000).

FIG. 12 illustrates a current that flows through each section of an inverter when the inverter output-voltage vector is the zero vector V0(000). As an example, FIG. 12 illustrates a current that flows through the inverter 2 when the output-voltage vector of the inverter 2 shifts from the real vector V1(100) to the zero vector V0(000).

As illustrated in FIG. 12, when the output-voltage vector of the inverter 2 shifts from the real vector V1(100) to the zero vector V0(000), a current hardly flows through the power-supply shunt resistance 5, and therefore the voltage Vx is almost zero between the X point and the negative-voltage side (the reference potential) of the DC power supply 1. At this time, the U-phase current iu flows from the X point through the freewheeling diode 4d toward the motor 9. The V-phase current iv flows from the motor 9 through the V-phase lower-arm switching element 3e and the V-phase lower-arm shunt resistance 6b toward the X point. The W-phase current iw flows from the motor 9 through the W-phase lower-arm switching element 3f and the W-phase lower-arm shunt resistance 6c toward the X point. At this time, the U-phase lower-arm voltage Vu, the V-phase lower-arm voltage Vv, and the W-phase lower-arm voltage Vw can be expressed by the following equations (25), (26), and (27).

$$Vu = (-iu) \times Rsh \quad (25)$$

$$Vv = iv \times Rsh \quad (26)$$

$$Vw = iw \times Rsh \quad (27)$$

That is, when the output-voltage vector of the inverter 2 shifts from the real vector V1(100) to the zero vector V0(000), by detecting the respective-phase lower-arm voltages Vu, Vv, and Vw, the respective-phase currents iu, iv, and iw can be calculated using the above equations (25), (26), and (27).

In the above example, a case has been described, in which the output-voltage vector of the inverter 2 shifts from the real vector V1(100) to the zero vector V0(000). Also in a case where the output-voltage vector of the inverter 2 shifts from another real vector to the zero vector V0(000), the respective-phase currents iu, iv, and iw can be calculated by detecting the respective-phase lower-arm voltages Vu, Vv, and Vw in the same manner.

As described above, in the power conversion device 100 according to the present embodiment, when the inverter output-voltage vector is the zero vector V0(000), it is possible to calculate phase currents for three phases by detecting the U-phase lower-arm voltage Vu, the V-phase lower-arm voltage Vv, and the W-phase lower-arm voltage Vw. The second threshold value V2 and the third threshold value V3 for the respective-phase lower-arm voltages Vu, Vv, and Vw are set. The second threshold value V2 and the third threshold value V3 correspond to the overcurrent detection value of the respective-phase currents iu, iv, and iw. It is therefore possible to perform overcurrent detection by simply detecting the respective-phase lower-arm voltages Vu, Vv, and Vw and comparing the respective-phase lower-arm voltages Vu, Vv, and Vw with the second threshold value V2 and the third threshold value V3.

The configuration in which lower-arm voltage detection units are provided for three phases has been described above. However, even with a configuration in which the lower-arm voltage detection units are provided for two phases, when the load device 9 is a balanced load, it is still possible to calculate the respective-phase currents iu, iv, and iw by using Kirchhoff's first law or the phase-current balancing condition. However, detailed descriptions of this configuration are omitted.

Figure 13:
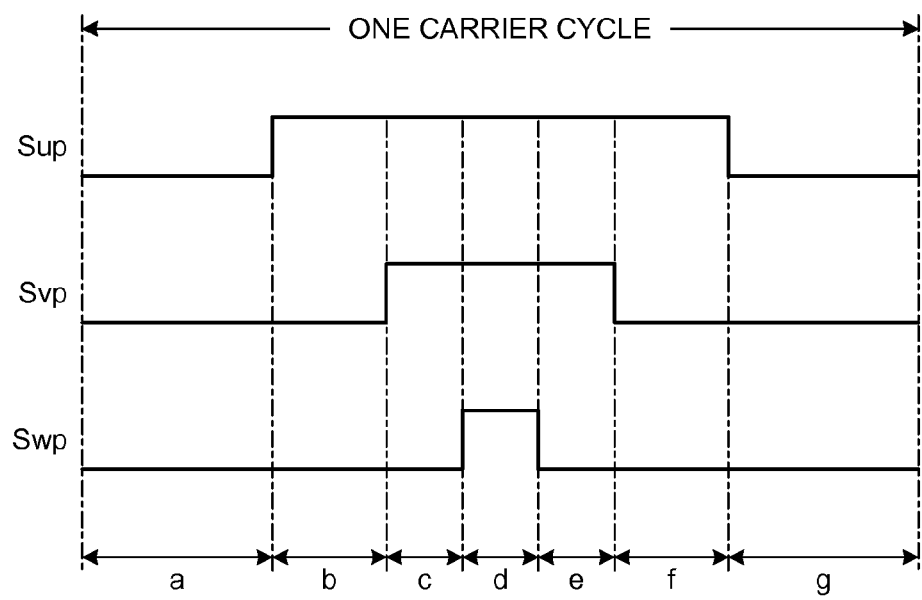
FIG. 13 is a diagram illustrating an example of a generation period of each output-voltage vector in one carrier cycle.

FIG. 13 is a diagram illustrating an example of a generation period of each output-voltage vector in one carrier cycle. FIG. 13 illustrates an example in which the output-voltage vector shifts from the zero vector V0(000) in an "a" period to the real vector V1(100) in a "b" period, to the real vector V4(110) in a "c" period, to the zero vector V7(111) in a "d" period, to the real vector V4(110) in an "e" period, to the real vector V1(100) in an "f" period, and to the zero vector V0(000) in a "g" period in the order in which the shifts appear in the sentence.

In the example illustrated in FIG. 13, the output-voltage vector is the zero vector V0(000) in the "a" period and the "g" period. Therefore, it is possible to perform overcurrent detection on the respective-phase currents iu, iv, and iw by detecting the U-phase lower-arm voltage Vu, the V-phase lower-arm voltage Vv, and the W-phase lower-arm voltage Vw. That is, in the "a" period and the "g" period, the second overcurrent detection unit 21b can perform overcurrent detection on the respective-phase currents iu, iv, and iw.

In the "b" period and the "f" period, the output-voltage vector is the real vector V1(100). Therefore, it is possible to perform overcurrent detection on the U-phase current iu by detecting the power-supply shunt-resistance voltage Vx. That is, in the "b" period and the "f" period, the first overcurrent detection unit 21a can perform overcurrent detection on the U-phase current iu.

In the "c" period and the "e" period, the output-voltage vector is the real vector V4(110). Therefore, it is possible to perform overcurrent detection on the W-phase current iw by detecting the power-supply shunt-resistance voltage Vx. That is, in the "c" period and the "e" period, the first overcurrent detection unit 21a can perform overcurrent detection on the W-phase current iw.

In the example described above, in one carrier cycle, the output-voltage vector shifts from the zero vector V0(000) to the real vector V1(100), to the real vector V4(110), to the zero vector V7(111), to the real vector V4(110), to the real vector V1(100), and to the zero vector V0(000) in the order in which the shifts appear in the sentence. However, the generation period of each output-voltage vector in one carrier cycle is not limited to the example illustrated in FIG. 13, and it is satisfactory if there are at least a single real vector and a single zero vector.

Therefore, in the power conversion device 100 according to the present embodiment, during the generation period of each of the real vectors V1(100), V2(010), V3(001), V4(110), V5(011), and V6(101), the first overcurrent detection unit 21a performs overcurrent detection on one of the respective-phase currents iu, iv, and iw, and therefore overcurrent detection without involving a computation process can be achieved. During the generation period of the zero vector V0(000), the second overcurrent detection unit 21b performs overcurrent detection on the respective-phase currents iu, iv, and iw, and therefore overcurrent detection without involving a computation process can be achieved.

That is, the power conversion device 100 according to the present embodiment includes the first overcurrent detection unit 21a and the second overcurrent detection unit 21b, and uses either one of the overcurrent detection result of the first overcurrent detection unit 21a and the overcurrent detection result of the second overcurrent detection unit 21b to perform overcurrent detection on respective-phase currents. Therefore, during the generation period of each output-voltage vector except the zero vector V7(111), overcurrent detection without involving a computation process can be achieved.

During the generation period of each of the real vectors V1(100), V2(010), V3(001), V4(110), V5(011), and V6(101), the switch unit 28 in the overcurrent-detection-result switching unit 25 is controlled at the first overcurrent detection unit 21*a* side. During the generation period of the zero vector V0(000), the switch unit 28 in the overcurrent-detection-result switching unit 25 is controlled at the second overcurrent detection unit 21*b* side. Therefore, it is satisfactory if a single first threshold value for the first overcurrent detection unit 21*a* is set, and a single second threshold value and a single third threshold value for the second overcurrent detection unit 21*b* are set. That is, it is necessary to set different threshold values when a phase current flows through both the power-supply shunt resistance 5 and the respective-phase lower-arm shunt resistances 6*a*, 6*b*, and 6*c* and when a phase current flows through either the power-supply shunt resistance 5 or the respective-phase lower-arm shunt resistances 6*a*, 6*b*, and 6*c*. However, in present embodiment, as described above, during the generation period of each of the real vectors V1(100), V2(010), V3(001), V4(110), V5(011), and V6(101), the switch unit 28 in the overcurrent-detection-result switching unit 25 is controlled at the first overcurrent detection unit 21*a* side. Also, during the generation period of the zero vector V0(000), the switch unit 28 in the overcurrent-detection-result switching unit 25 is controlled at the second overcurrent detection unit 21*b* side. This always leads to the overcurrent detection result obtained when a phase current flows through either the power-supply shunt resistance 5 or the respective-phase lower-arm shunt resistances 6*a*, 6*b*, and 6*c*, and therefore the detection result obtained when a phase current flows through both the power-supply shunt resistance 5 and the respective-phase lower-arm shunt resistances 6*a*, 6*b*, and 6*c* can be eliminated. Accordingly, the first threshold value that is set for the first overcurrent detection unit 21*a* and the second threshold value and the third threshold value that are set for the second overcurrent detection unit 21*b* do not need to be changed according to the output-voltage vector, and consequently overcurrent detection can be performed reliably.

As described above, the power conversion device according to the first embodiment includes a power-supply shunt resistance that is provided between an inverter and the negative-voltage side of a DC power supply, respective-phase lower-arm shunt resistances that are provided between the power-supply shunt resistance and respective-phase lower-arm switching elements, respectively, a first overcurrent detection unit that performs overcurrent detection on a current that flows through the power-supply shunt resistance on the basis of a power-supply shunt-resistance voltage that is a voltage between the negative-voltage side (the reference potential) of the DC power supply and a connection point where the power-supply shunt resistance and the respective-phase lower-arm shunt resistances are connected, and a second overcurrent detection unit that performs overcurrent detection on each current that flows through the respective-phase lower-arm shunt resistances on the basis of the respective-phase lower-arm voltages that are voltages between the negative-voltage side (the reference potential) of the DC power supply and connection points where the respective-phase lower-arm switching elements and the respective-phase lower-arm shunt resistances are connected, wherein overcurrent detection is performed on each phase current, using either one of the overcurrent detection result of the first overcurrent detection unit and the overcurrent detection result of the second overcurrent detection unit. Therefore, in an ON/OFF state of respective-phase upper-arm switching elements, i.e., not only when the inverter output-voltage vector is the zero vector V0, but also when the inverter output-voltage vector is any of the real vectors V1to V6, overcurrent detection can be performed on each phase current without involving a computation process. Accordingly, an extended overcurrent detection period and a simplified overcurrent detection procedure for a phase current can be achieved, and operational reliability of the inverter and a load device can be improved.

During the generation period of each of the real vectors V1(100), V2(010), V3(001), V4(110), V5(011), and V6(101), a switch unit in an overcurrent-detection-result switching unit is controlled at the first overcurrent detection unit side. During the generation period of the zero vector V0(000), the switch unit in the overcurrent-detection-result switching unit is controlled at the second overcurrent detection unit 21*b* side. This always leads to the overcurrent detection result obtained when a phase current flows through either the power-supply shunt resistance or the respective-phase lower-arm shunt resistances, and therefore the detection result obtained when a phase current flows through both the power-supply shunt resistance and the respective-phase lower-arm shunt resistances can be eliminated. Accordingly, the first threshold value that is set for the first overcurrent detection unit and the second threshold value and the third threshold value that are set for the second overcurrent detection unit do not need to be changed according to the inverter output-voltage vector, and consequently overcurrent detection can be performed reliably.

Second Embodiment

In the first embodiment, an example has been described, in which in accordance with the inverter output-voltage vector, the overcurrent detection result of the first overcurrent detection unit and the overcurrent detection result of the second overcurrent detection unit are switched therebetween. In the present embodiment, an example is described, in which in accordance with the inverter operation state or modulation ratio, the overcurrent detection result of the first overcurrent detection unit and the overcurrent detection result of the second overcurrent detection unit are switched therebetween. Because the configurations of a power conversion device according to the second embodiment are identical to those of the power conversion device according to the first embodiment, descriptions thereof are omitted here.

In the present embodiment, the switch unit 28 in the overcurrent-detection-result switching unit 25 switches between the detection result of the first overcurrent detection unit 21*a* and the detection result of the second overcurrent detection unit 21*b* according to the operation state or the modulation ratio of the inverter 2, and outputs the detection result as OC3.

Figure 14:
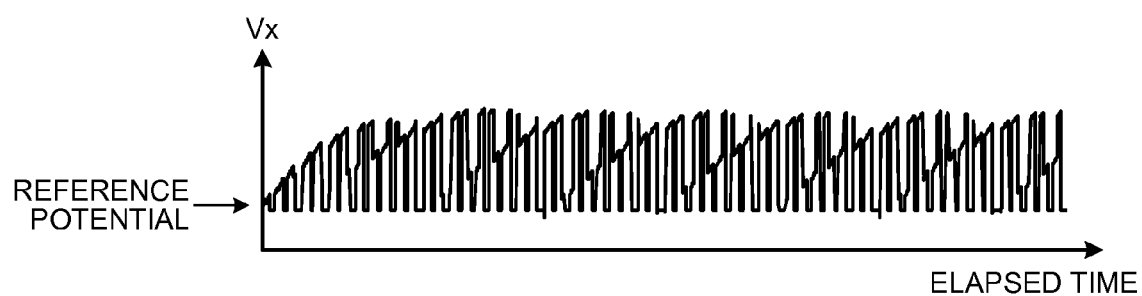
FIG. 14 is a diagram illustrating a transition of a power-supply shunt-resistance voltage Vx when the inverter modulation ratio is relatively high.
Figure 15:
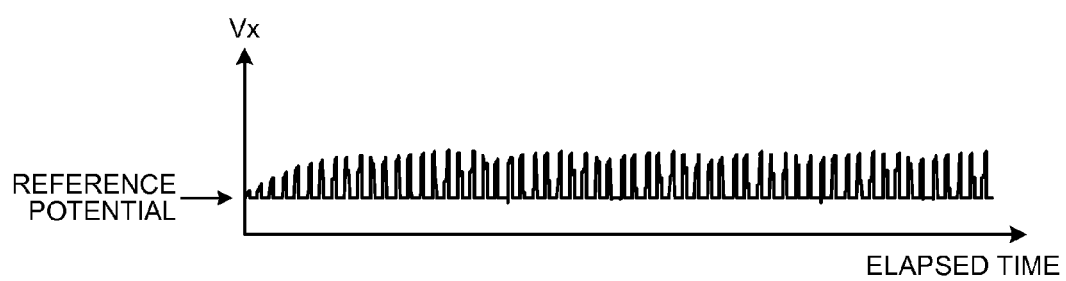
FIG. 15 is a diagram illustrating a transition of the power-supply shunt-resistance voltage Vx when the inverter modulation ratio is relatively low.
Figure 16:
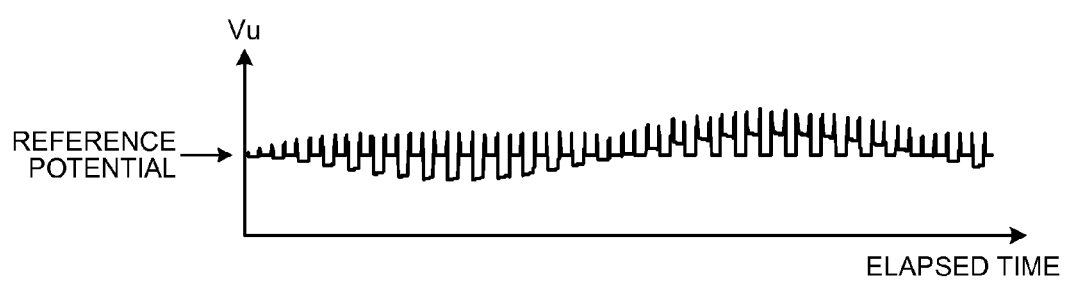
FIG. 16 is a diagram illustrating a transition of a U-phase lower-arm voltage Vu when the inverter modulation ratio is relatively low.

FIG. 14 is a diagram illustrating a transition of the power-supply shunt-resistance voltage Vx when the inverter modulation ratio is relatively high. FIG. 15 is a diagram illustrating a transition of the power-supply shunt-resistance voltage Vx when the inverter modulation ratio is relatively low. FIG. 16 is a diagram illustrating a transition of the U-phase lower-arm voltage Vu when the inverter modulation ratio is relatively low.

As illustrated in FIG. 14, when the modulation ratio of the inverter 2 is relatively high in the normal operation range, the generation period of the real vectors V1(100) to V6(101) is long, while the generation period of the zero vector V0(000) is short.

As illustrated in FIGS. 15 and 16, when the modulation ratio of the inverter 2 is relatively low in the low-speed operation range, the generation period of the zero vector V0(000) is long, while the generation period of the real vectors V1(100) to V6(101) is short.

Therefore, in the present embodiment, in an operation state such as a long-duration operation with a high modulation ratio of the inverter 2, during the generation period of the real vectors V1(100) to V6(101), the switch unit 28 is controlled at the first overcurrent detection unit 21*a* side to select the detection result (OC1) of the first overcurrent detection unit 21*a*. Also, in an operation state such as a long-duration operation with a low modulation ratio of the inverter 2, during the generation period of the zero vector V0(000), the switch unit 28 is controlled at the second overcurrent detection unit 21*b* side to select the detection result (OC2) of the second overcurrent detection unit 21*b*.

Further, as a trigger to switch the switch unit 28 between the detection results, a threshold value for the modulation ratio of the inverter 2 is set. When the modulation ratio of the inverter 2 is greater than the threshold value, during the generation period of the real vectors V1(100) to V6(101), the switch unit 28 is controlled at the first overcurrent detection unit 21*a* side to select the detection result (OC1) of the first overcurrent detection unit 21*a*. When the modulation ratio of the inverter 2 is equal to or less than the threshold value, during the generation period of the zero vector V0(000), the switch unit 28 is controlled at the second overcurrent detection unit 21*b* side to select the detection result (OC2) of the second overcurrent detection unit 21*b*.

In the present embodiment, in an operation state such as a long-duration operation with a high modulation ratio of the inverter 2 or when the modulation ratio of the inverter 2 is greater than the threshold value, the switch unit 28 is controlled such that it is off during the generation period of the zero vector V0(000) in order not to select any detection result. Also in an operation state such as a long-duration operation with a low modulation ratio of the inverter 2 or when the modulation ratio of the inverter 2 is equal to or less than the threshold value, the switch unit 28 is controlled such that it is off during the generation period of the real vectors V1(100) to V6(101) in order not to select any detection result.

With this configuration, in a similar manner to the first embodiment, the first threshold value that is set for the first overcurrent detection unit and the second threshold value and the third threshold value that are set for the second overcurrent detection unit do not need to be changed according to the output-voltage vector of the inverter 2. Further, a detection result from an output-voltage vector generated in a short period can be eliminated, and therefore it is possible to achieve high accuracy in overcurrent detection.

As described above, in the power conversion device according to the second embodiment, according to the operation state or the modulation ratio of the inverter, the overcurrent detection result of the first overcurrent detection unit and the overcurrent detection result of the second overcurrent detection unit are switched therebetween. In an operation state such as a long-duration operation with a high modulation ratio of the inverter or when the modulation ratio of the inverter is greater than a threshold value, during the generation period of the real vectors V1(100) to V6(101), a switch unit in the overcurrent-detection-result switching unit is controlled at the first overcurrent detection unit side to select the detection result of the first overcurrent detection unit. The switch unit in the overcurrent-detection-result switching unit is controlled such that it is off during the generation period of the zero vector V0(000) in order not to select any detection result. In an operation state such as a long-duration operation with a low modulation ratio of the inverter or when the modulation ratio of the inverter is equal to or less than the threshold value, the switch unit in the overcurrent-detection-result switching unit is controlled at the second overcurrent detection unit side to select the detection result (OC2) of the second overcurrent detection unit. The switch unit in the overcurrent-detection-result switching unit is controlled such that it is off during the generation period of the real vectors V1(100) to V6(101) in order not to select any detection result. Therefore, in a similar manner to the first embodiment, the first threshold value that is set for the first overcurrent detection unit and the second threshold value and the third threshold value that are set for the second overcurrent detection unit do not need to be changed according to the inverter output-voltage vector. Further, a detection result from an output-voltage vector generated in a short period can be eliminated, and therefore it is possible to achieve high accuracy in overcurrent detection.

In the above embodiments, the configuration example has been described, in which an overcurrent-detection-result switching unit, a state holding unit, and an inverter-drive stopping unit are included in a control unit. However, it is also possible to provide the overcurrent-detection-result switching unit, the state holding unit, or the inverter-drive stopping unit outside the control unit.

For example, when it is desired to reduce the number of overcurrent detection ports in the control unit, the overcurrent-detection-result switching unit is provided outside the control unit, and therefore the number of overcurrent detection ports in the control unit can be reduced to one.

It is also possible to simplify the configuration of the control unit by providing a latch circuit that constitutes the state holding unit outside the control unit.

Further, it is possible to provide the inverter-drive stopping unit is provided in a drive unit and drive the respective-phase upper-arm switching elements and the respective-phase lower-arm switching elements on the basis of the AND operation result of each drive signal and the output of the state holding unit. It is also possible to drive the respective-phase upper-arm switching elements and the respective-phase lower-arm switching elements on the basis of the AND operation result of the output of the state holding unit and a gate signal of the respective-phase upper-arm switching elements and the respective-phase lower-arm switching elements, where the gate signal is generated on the basis of each drive signal.

As described above, even with the configuration in which the overcurrent-detection-result switching unit, the state holding unit, or the inverter-drive stopping unit is provided outside the control unit, it is apparent that the effects identical to those in the above embodiments can still be obtained.

It is also possible to apply the power conversion device described in the above embodiments to a motor drive device in which the load is a motor, and to apply this motor drive device to an air blower or a compressor for an air conditioner, a refrigerator, a freezer, or other devices. It is apparent that operational reliability of these devices and apparatuses can be improved.

In the above embodiments, the example has been described, in which in respective-phase voltage comparison units, a second threshold value and a third threshold value, which is greater than this second threshold value, for the respective-phase lower-arm voltages are set. When the respective-phase lower-arm voltages are equal to or greater than the second threshold value and equal to or less than the third threshold value, the respective-phase voltage comparison units output a value indicating that the current value of each current that flows through the respective-phase lower-arm shunt resistances is normal. Also, when the respective-phase lower-arm voltages are less than the second threshold value or greater than the third threshold value, the respective-phase voltage comparison units output a value indicating that overcurrent flows through the respective-phase lower-arm shunt resistances. However, depending on the system or application purpose, it is also possible to use either one of the second threshold value and the third threshold value to perform an overcurrent determination. For example, when only the second threshold value is set to perform an overcurrent determination, it is satisfactory that when the respective-phase lower-arm voltages are equal to or greater than the second threshold value, the respective-phase voltage comparison units output a value indicating that the current value of each current that flows through the respective-phase lower-arm shunt resistances is normal, and when the respective-phase lower-arm voltages are less than the second threshold value, the respective-phase voltage comparison units output a value indicating that overcurrent flows through the respective-phase lower-arm shunt resistances. For another example, when only the third threshold value is set to perform an overcurrent determination, it is satisfactory that when the respective-phase lower-arm voltages are equal to or less than the third threshold value, the respective-phase voltage comparison units output a value indicating that the current value of each current that flows through the respective-phase lower-arm shunt resistances is normal, and when the respective-phase lower-arm voltages are greater than the third threshold value, the respective-phase voltage comparison units output a value indicating that overcurrent flows through the respective-phase lower-arm shunt resistances.

The configurations described in the above embodiments are only examples of the configuration of the present invention, and it is possible to combine these configurations with other publicly-known techniques, and it is needless to mention that the present invention can be configured while modifying it without departing from the scope of the invention, such as omitting a part of these configurations.

INDUSTRIAL APPLICABILITY

As describe above, the power conversion device according to the present invention, a motor drive device including the power conversion device, an air blower and a compressor, each of which includes the motor drive device, and an air conditioner, a refrigerator, and a freezer, each of which includes the air blower and the compressor, are useful for a configuration including a PWM three-phase inverter. Particularly, they are suitable as a technique to achieve an extended overcurrent detection period and a simplified overcurrent detection procedure for a phase current, and also to improve operational reliability of respective devices and respective apparatuses.

The invention claimed is:
1. A power conversion device that converts DC power supplied from a DC power supply to AC power and that supplies the AC power to a load, the power conversion device comprising:
an inverter that is configured by connecting arms in parallel, each of the arms including an upper-arm switching element and a lower-arm switching element;
a power-supply shunt resistance that is provided on a current path between the inverter and the DC power supply;
respective-phase lower-arm shunt resistances that are provided between the power-supply shunt resistance and the lower-arm switching elements for respective phases, respectively;
a first overcurrent detection unit to detect overcurrent of a current that flows through the power-supply shunt resistance;
a second overcurrent detection unit to detect overcurrent of at least one of currents that flow through the respective-phase lower-arm shunt resistances; and
a control unit to check overcurrent by using either one of a detection result of the first overcurrent detection unit and a detection result of the second overcurrent detection unit and stop outputting a drive signal to the inverter in accordance with a check result, wherein
the control unit selects a detection result of the first overcurrent detection unit during a period within which a drive signal that turns on one or two of the upper-arm switching elements is generated, and
the control unit selects a detection result of the second overcurrent detection unit during a period within which a drive signal that turns off all the upper-arm switching elements is generated.

2. A power conversion device that converts DC power supplied from a DC power supply to AC power and that supplies the AC power to a load, the power conversion device comprising:
an inverter that is configured by connecting arms in parallel, each of the arms including an upper-arm switching element and a lower-arm switching element;
a power-supply shunt resistance that is provided on a current path between the inverter and the DC power supply;
respective-phase lower-arm shunt resistances that are provided between the power-supply shunt resistance and the lower-arm switching elements for respective phases, respectively;
a first overcurrent detection unit to detect overcurrent of a current that flows through the power-supply shunt resistance;
a second overcurrent detection unit to detect overcurrent of at least one of currents that flow through the respective-phase lower-arm shunt resistances; and
a control unit to check overcurrent by using either one of a detection result of the first overcurrent detection unit and a detection result of the second overcurrent detection unit and stop outputting a drive signal to the inverter in accordance with a check result, wherein
the control unit selects either one of a detection result of the first overcurrent detection unit and a detection result of the second overcurrent detection unit in accordance with a magnitude of a modulation ratio of the inverter.

3. The power conversion device according to claim 1, wherein
in the first overcurrent detection unit, a first threshold value for the power-supply shunt-resistance voltage is set in advance, and, when the power-supply shunt-resistance voltage is equal to or less than the first threshold value, the first overcurrent detection unit outputs a value as an overcurrent detection result to the control unit, with the value indicating that a current value of a current that flows through the power-supply shunt resistance is normal, and when the power-supply shunt-resistance voltage is greater than the first threshold value, the first overcurrent detection unit outputs a value as an overcurrent detection result to the control unit, with the value indicating that overcurrent flows through the power-supply shunt resistance, and in the second overcurrent detection unit, at least one of a second threshold value and a third threshold value, which is greater than the second threshold value, for the respective-phase lower-arm voltages is set in advance, and, when the respective-phase lower-arm voltages are equal to or greater than the second threshold value or are equal to or less than the third threshold value or when the respective-phase lower-arm voltages are equal to or greater than the second threshold value and equal to or less than the third threshold value, the second overcurrent detection unit outputs a value as an overcurrent detection result to the control unit, with the value indicating that a current value of each current that flows through the respective-phase lower-arm shunt resistances is normal, and when at least one of the respective-phase lower-arm voltages is less than the second threshold value or greater than the third threshold value, the second overcurrent detection unit outputs a value as an overcurrent detection result to the control unit, with the value indicating that overcurrent flows through the respective-phase lower-arm shunt resistances.

4. The power conversion device according to claim 1, wherein the control unit includes an overcurrent-detection-result switching unit to switch between an overcurrent detection result of the first overcurrent detection unit and an overcurrent detection result of the second overcurrent detection unit and output the overcurrent detection result, a state holding unit to hold therein an output of the overcurrent-detection-result switching unit, and an inverter-drive stopping unit to stop outputting each of the drive signals when an output of the state holding unit is a value indicating that overcurrent flows through the power-supply shunt resistance or through any of the respective-phase lower-arm shunt resistances.

5. A motor drive device comprising the power conversion device according to claim 1.

6. An air blower comprising the motor drive device according to claim 5.

7. A compressor comprising the motor drive device according to claim 5.

8. An air conditioner comprising the air blower according to claim 6.

9. A power conversion device that converts DC power supplied from a DC power supply to AC power and that supplies the AC power to a load, the power conversion device comprising:

an inverter that is configured by connecting arms in parallel, each of the arms including an upper-arm switching element and a lower-arm switching element;

a power-supply shunt resistance that is provided on a current path between the inverter and the DC power supply;

respective-phase lower-arm shunt resistances that are provided between the power-supply shunt resistance and the lower-arm switching elements for respective phases, respectively;

a first overcurrent detection unit to detect overcurrent of a current that flows through the power-supply shunt resistance;

a second overcurrent detection unit to detect overcurrent of at least one of currents that flow through the respective-phase lower-arm shunt resistances; and a control unit to check overcurrent by using either one of a detection result of the first overcurrent detection unit and a detection result of the second overcurrent detection unit and stop outputting a drive signal to the inverter in accordance with a check result, wherein the control unit stops outputting a detection result of the second overcurrent detection unit during a period within which a drive signal that turns on one or two of the upper-arm switching elements is generated, and the control unit stops outputting a detection result of the first overcurrent detection unit during a period within which a drive signal that turns off all the upper-arm switching elements is generated.

10. The power conversion device according to claim 9, wherein in the first overcurrent detection unit, a first threshold value for the power-supply shunt-resistance voltage is set in advance, and, when the power-supply shunt-resistance voltage is equal to or less than the first threshold value, the first overcurrent detection unit outputs a value as an overcurrent detection result to the control unit, with the value indicating that a current value of a current that flows through the power-supply shunt resistance is normal, and when the power-supply shunt-resistance voltage is greater than the first threshold value, the first overcurrent detection unit outputs a value as an overcurrent detection result to the control unit, with the value indicating that overcurrent flows through the power-supply shunt resistance, and in the second overcurrent detection unit, at least one of a second threshold value and a third threshold value, which is greater than the second threshold value, for the respective-phase lower-arm voltages is set in advance, and, when the respective-phase lower-arm voltages are equal to or greater than the second threshold value or are equal to or less than the third threshold value or when the respective-phase lower-arm voltages are equal to or greater than the second threshold value and equal to or less than the third threshold value, the second overcurrent detection unit outputs a value as an overcurrent detection result to the control unit, with the value indicating that a current value of each current that flows through the respective-phase lower-arm shunt resistances is normal, and when at least one of the respective-phase lower-arm voltages is less than the second threshold value or greater than the third threshold value, the second overcurrent detection unit outputs a value as an overcurrent detection result to the control unit, with the value indicating that overcurrent flows through the respective-phase lower-arm shunt resistances.

11. The power conversion device according to claim 9, wherein the control unit includes an overcurrent-detection-result switching unit to switch between an overcurrent detection result of the first overcurrent detection unit and an overcurrent detection result of the second overcurrent detection unit and output the overcurrent detection result, a state holding unit to hold therein an output of the overcurrent-detection-result switching unit, and an inverter-drive stopping unit to stop outputting each of the drive signals when an output of the state holding unit is a value indicating that overcurrent flows through the power-supply shunt resistance or through any of the respective-phase lower-arm shunt resistances.

12. A motor drive device comprising the power conversion device according to claim 9.

13. An air blower comprising the motor drive device according to claim 12.

14. A compressor comprising the motor drive device according to claim 12.

15. The power conversion device according to claim 2 wherein when the modulation ratio is greater than a predetermined threshold value, the control unit selects a detection result of the first overcurrent detection unit, and when the modulation ratio is equal to or less than the threshold value, the control unit selects a detection result of the second overcurrent detection unit.

16. The power conversion device according to claim 2, wherein in the first overcurrent detection unit, a first threshold value for the power-supply shunt-resistance voltage is set in advance, and, when the power-supply shunt-resistance voltage is equal to or less than the first threshold value, the first overcurrent detection unit outputs a value as an overcurrent detection result to the control unit, with the value indicating that a current value of a current that flows through the power-supply shunt resistance is normal, and when the power-supply shunt-resistance voltage is greater than the first threshold value, the first overcurrent detection unit outputs a value as an overcurrent detection result to the control unit, with the value indicating that overcurrent flows through the power-supply shunt resistance, and in the second overcurrent detection unit, at least one of a second threshold value and a third threshold value, which is greater than the second threshold value, for the respective-phase lower-arm voltages is set in advance, and, when the respective-phase lower-arm voltages are equal to or greater than the second threshold value or are equal to or less than the third threshold value or when the respective-phase lower-arm voltages are equal to or greater than the second threshold value and equal to or less than the third threshold value, the second overcurrent detection unit outputs a value as an overcurrent detection result to the control unit, with the value indicating that a current value of each current that flows through the respective-phase lower-arm shunt resistances is normal, and when at least one of the respective-phase lower-arm voltages is less than the second threshold value or greater than the third threshold value, the second overcurrent detection unit outputs a value as an overcurrent detection result to the control unit, with the value indicating that overcurrent flows through the respective-phase lower-arm shunt resistances.

17. The power conversion device according to claim 2, wherein the control unit includes an overcurrent-detection-result switching unit to switch between an overcurrent detection result of the first overcurrent detection unit and an overcurrent detection result of the second overcurrent detection unit and output the overcurrent detection result, a state holding unit to hold therein an output of the overcurrent-detection-result switching unit, and an inverter-drive stopping unit to stop outputting each of the drive signals when an output of the state holding unit is a value indicating that overcurrent flows through the power-supply shunt resistance or through any of the respective-phase lower-arm shunt resistances.

18. A motor drive device comprising the power conversion device according to claim 2.

19. An air blower comprising the motor drive device according to claim 18.

20. A compressor comprising the motor drive device according to claim 18.

* * * * *